US012242655B2

(12) United States Patent
Roche et al.

(10) Patent No.: US 12,242,655 B2
(45) Date of Patent: Mar. 4, 2025

(54) SYSTEM AND METHOD FOR SECURITY MANAGEMENT THOUGH FORENSIC ANALYSIS OF IMAGES OF SCENES

(71) Applicant: Dell Products L.P., Round Rock, TX (US)

(72) Inventors: Ian Roche, Glanmire (IE); Philip E. Hummel, San Jose, CA (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 246 days.

(21) Appl. No.: 18/068,766

(22) Filed: Dec. 20, 2022

(65) Prior Publication Data

US 2024/0202371 A1    Jun. 20, 2024

(51) Int. Cl.
*G06F 21/62* (2013.01)

(52) U.S. Cl.
CPC .................. *G06F 21/629* (2013.01)

(58) Field of Classification Search
CPC .............................. G06F 21/629; G06V 20/52
See application file for complete search history.

(56) References Cited

U.S. PATENT DOCUMENTS

| | | | |
|---|---|---|---|
| 11,810,028 B2 * | 11/2023 | Trelin | G07C 9/37 |
| 2014/0229224 A1 * | 8/2014 | Appel | G06Q 10/06315 |
| | | | 705/7.12 |
| 2019/0043207 A1 * | 2/2019 | Carranza | G06V 20/52 |

OTHER PUBLICATIONS

Li, Meiman et al., "Pedestrian Motion Path Detection Method Based on Deep Learning and Foreground Detection." Complexity 2021 (11 Pages).
Hasan, Irtiza et al., "Pedestrian Detection: Domain Generalization, CNNs, Transformers and Beyond." arXiv preprint arXiv:2201. 03176 (2022) (13 Pages).
Hellinga, Bruce et al., "Route selection considering travel time variability." 6th World Congress on Intelligent Transport Systems, Toronto, Ontario. 1999 (8 Pages).
Hutchinson, Chris, "Building a Real-world Public Transport Routing Algorithm", Aug. 8, 2021, <https://traveltime.com/blog/public-transport-routing-algorithm> (13 Pages).

(Continued)

*Primary Examiner* — Thaddeus J Plecha
(74) *Attorney, Agent, or Firm* — WOMBLE BOND DICKINSON (US) LLP

(57) ABSTRACT

Methods and systems for providing security management services are disclosed. To provide security management services in a manner that reduces the quantity of hardware resources necessary to provide the security management services, the security manager may prioritize security management services based on a trained state of a data processing system to modify a level of surveillance of the persons. By doing so, the device management services may only be provided when certain conditions are met rather than continuously. To place the data processing system in the trained state, the data processing system may need to be trained to predict paths that individuals are likely to traverse using training data. To obtain the training data, previously traversed paths of individuals may be tracked through an environment and stored into a database.

20 Claims, 17 Drawing Sheets

(56) References Cited

OTHER PUBLICATIONS

Huang, Wenbo et al., "Dynamic Guidance Strategy for Pedestrian Travel in Large-Scale Activity under Harsh Environment." Journal of Advanced Transportation 2022 (16 Pages).
Makris, Dimitrios et al., "Path detection in video surveillance." image and Vision Computing 20.12 (2002): 895-903 (18 Pages).

* cited by examiner

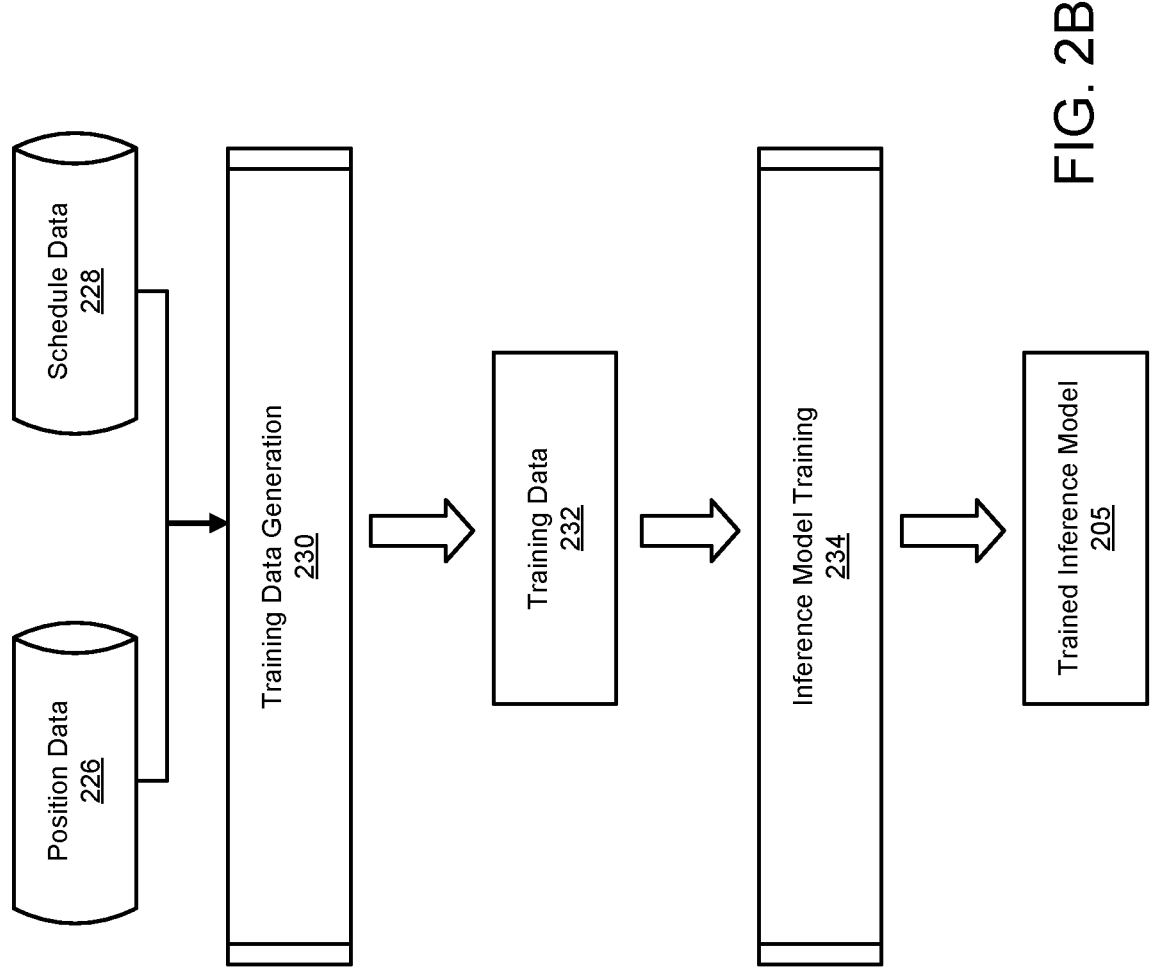

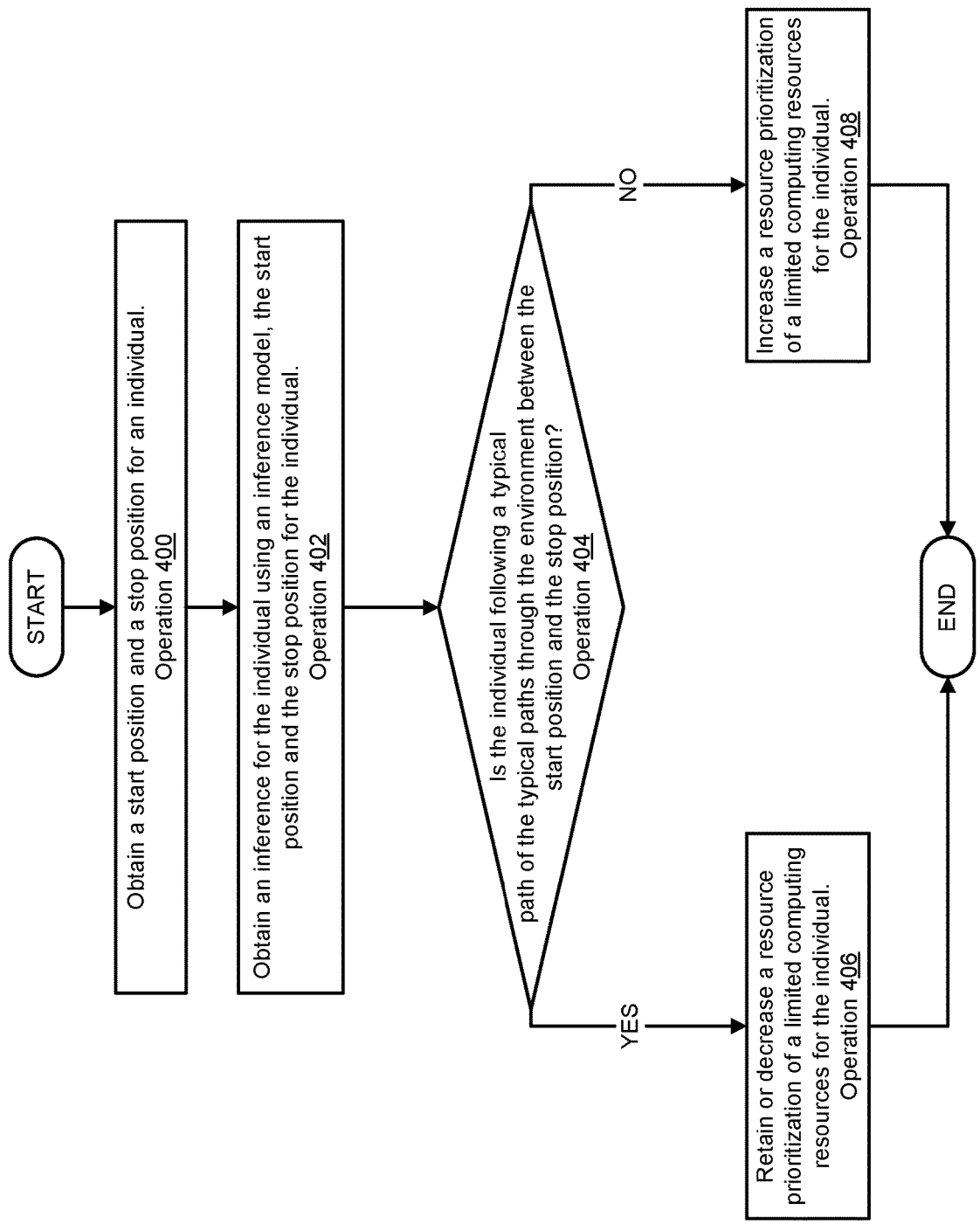

SYSTEM AND METHOD FOR SECURITY MANAGEMENT THOUGH FORENSIC ANALYSIS OF IMAGES OF SCENES

FIELD

Embodiments disclosed herein relate generally to security management services. More particularly, embodiments disclosed herein relate to systems and methods for prioritizing limited computing resources based on paths of individuals throughout a distributed environment.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 2B shows a data flow diagram showing inference model training in accordance with an embodiment.

FIG. 4A shows a flow diagram illustrating a method of prioritizing limited computing resources based on behaviors of individuals in accordance with an embodiment.

DETAILED DESCRIPTION

Figure 1:
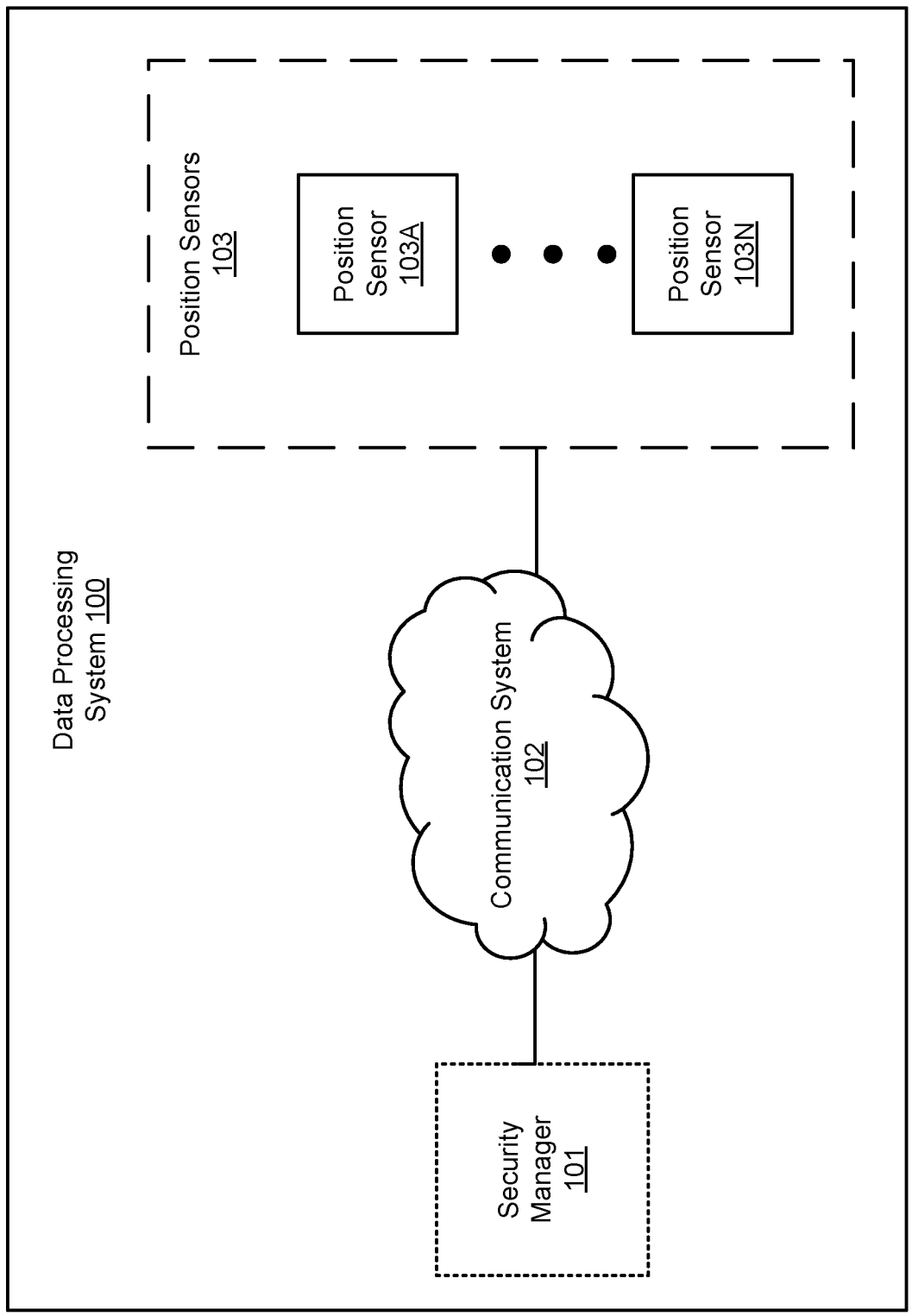
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

In general, embodiments disclosed herein relate to methods and systems for providing, at least in part, security management services. To provide security management services, the system may include any number of data processing systems. A data processing system may include a finite quantity of hardware resources in order to provide the computer-implemented services to consumers of the services. The finite quantity of hardware resources may limit the quantity and types of computer-implemented services that may be provided at any point in time (e.g., limited tracking and analyzing the activities of individuals within an environment that may pose a security threat). Consequently, individuals that may pose a security risk may not be identified and therefore may present an unmitigated security threat within the environment.

In order to provide security management services in a manner that reduces the quantity of hardware resources necessary to provide the security management services, the security manager may prioritize security management services based on the likelihood of individuals posing a security risk.

To identify the security risks of the individuals, the paths of the individuals traversing through an environment may be tracked and compared to typical paths through environments that are followed by most individuals that traverse through the environment. An individual that does not follow one of the typical paths through an environment may indicate a security risk and the security management services may be prioritized for use on the individual posing a security risk. By doing so, fewer hardware resources may be expended for providing the security management services for individuals that do not pose a security risk. The security management services may then have more hardware resources readily available and therefore more capable of identifying potential security threats in dense environments. Accordingly, the cost and resources expended for providing security management services may be further reduced.

To obtain the typical paths of the individuals, the data processing system may be placed in a trained state. The trained state may allow the data processing system to provide security management services such as tracking and/or analyzing activities of individuals in an environment. This tracking and/or analyzing may be done in a manner that reduces the quantity of hardware resources necessary to provide the security management services (as previously mentioned).

To place the data processing system in the trained state, an inference model of the data processing system may be trained (configured) to predict paths that individuals are likely to traverse using training data.

To obtain the training data, traversed paths of individuals may be tracked through an environment and stored into a database. These traversed paths may start at a start position and end at a presumed stop position. These start positions and presumed stop positions may be stored in the database with the associated paths.

Thus, training data may be obtained, where the training data is made up of input data and output data. The start positions and the presumed stop positions of individuals may be used as input data, while previously traversed paths of the individuals may be used as output data thereby establishing a relationship that may be used to train an inference model. Using this input and output data, a supervised learning method may be used to train the inference model to predict a future path that a future individual is likely to traverse based on a known start position and a known presumed stop position of the future individual.

In an embodiment, a method for prioritizing allocation of limited computing resources of a data processing system is provided.

The method may include obtaining an identifier; obtaining schedule data using the identifier, the schedule data specifying a start position and a presumed stop position for a person, the person being presumed to traverse to the presumed stop position from the start position; performing a forensic search of sensor data for instances of appearances of the person identified by the identifier to obtain position data for the person; generating a path based on the position data, the path being followed by the person after the person leaves the start position specified by the schedule data; obtaining training data based on the path and the schedule data; and allocating the limited computing resources of the data processing system based on the training data to modify a level of surveillance of the person.

Obtaining the identifier may include, during a check in process, reading the identifier from an article controlled by the person.

Obtaining the schedule data may include, performing a lookup based on the identifier, the lookup returning a gate out of which the person is expected to depart in the future, and the stop position is a location of the gate.

Performing the forensic search may include obtaining images of scenes in which the person may be present as the person moves toward the gate; filtering the images for instances of appearances of the person to identify a portion of the images in which the person appears; and for each image of the portion of the images, marking: the person as being at a location corresponding to a sensor of sensors through which the image was obtained, and the person as being present at the location when the image was obtained.

Generating the path may include temporally ordering the locations based on when the person was marked as being present at the locations.

Obtaining the training data based on the path and the schedule data may include establishing a relationship between: a pair of the start position and the stop position, and the path.

Allocating the limited computing resources of the data processing system based on the training data to modify a level of surveillance of the person may include obtaining a trained inference model using the relationship; obtaining an inference using the trained inference model, the inference indicating a path that a second person must follow to be considered low risk; monitoring an actual path of the second person using the sensors; making a comparison between the path that a second person must follow to be considered low risk and the actual path; and in an instance of the comparison where the actual path diverges from the path that the second person must follow to be considered low risk: increasing a level of expenditure of the limited computing resources to monitor the second person.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer implemented services including database services, instant messaging services, security management services, and/or other types of computer implemented services. The security management services may be provided by various portions of the system of FIG. 1.

The system may include, for example, data processing system 100. Data processing system 100 may provide, at least in part, the security management services.

Data processing system 100 may include a finite quantity of hardware resources in order to provide the computer-implemented services to consumers of the services. However, the finite quantity of hardware resources may limit the quantity and types of computer-implemented services that may be provided at any point in time.

For example, providing the security management services may consume hardware resources such as processor cycles, memory space, storage space, etc. Accordingly, data processing system 100 may only be able to provide a limited quantity of the security services. This limitation may prevent the system of 100 from granularly tracking and analyzing the activities of all individuals within a predetermined area at a desired level of fidelity of tracking and analyzation sufficient to meet certain goals.

Now, consider a scenario where a large number of individuals are located in a dense environment such as an airport. The locations and activities of the individuals in the airport may change over time. To ascertain whether any of the individuals present a security risk to the airport, the individual activities of the individuals may need to be analyzed. However, doing so may not be possible due to the finite quantity of hardware resources available to perform the analysis. Consequently, individuals that present a security risk may not be identified thereby presenting a potential and unmitigated threat to the airport.

In general, embodiments disclosed herein may provide methods, systems, and/or devices for providing security management services in a manner that reduces the quantity of hardware resources necessary to provide the security management services. By doing so, the provided security management services may be more capable of identifying potential security threats in dense environments.

To provide the security management services, a system in accordance with an embodiment may prioritize security management services based on the likelihood of individuals posing a security risk. By doing so, fewer hardware resources may be expended for providing the security management services for individuals that are less likely to pose the security risk. Accordingly, the computational efficiency for providing the security management services may be improved (e.g., when compared to scenarios in which performance of the security management services are not prioritized).

To identify the security risks (e.g., security risk levels) of the individuals, the paths of the individuals through an environment may be tracked and compared to typical paths through environments that are followed by most individuals that traverse through the environment. These typical paths may be predicted by an inference model that is trained to predict an individual's path based on the individual's start position and presumed stop position (discussed further with respect to FIG. 2C). By doing so, allocation of limited computing resources may be prioritized based on the predictions made by the inference model.

In the context of an airport environment, for example, that paths may be from check in counters to the gates from which planes depart. The paths may depend on the types of the environments in which the individuals reside.

In the event that at least one of the individuals does not follow one of the typical paths through an environment, the security management services may be prioritized for use on the individual(s) (e.g., thereby identifying the individuals as posing security risk). By doing so, the security management services may be prioritized for use on individuals that may be more likely to be an actual security risk (e.g., in comparison to indiscriminate deployment of security management services randomly or broadly for all individuals within an environment). For example, in the context of the airport environment, a person ticketed out of flight that leaves from gate B3 may be flagged as a security risk when the person, instead of walking along a typical path to gate B3, walks to the pilot's lounge. In contrast, if the person walked along any typical path from the ticket counter to gate B3, then the person may not be flagged as a security risk. When flagged, various downstream processes may be deployed to more granularly track and analyze the activities of the person thereby preferentially directing the use of the limited computing resources for persons that are following anomalous paths.

To provide its functionality as part of the system, data processing system 100 may include security manager 101, position sensors 103, and communication system 102. Each of these components is discussed below.

Security manager 101 may provide all, or a portion, of the computer-implemented services including the security management services. For example, security manager 101 may provide computer-implemented services to users of security manager 101 and/or other computing devices operably connected to security manager 101.

When providing the computer-implemented services, security manager 101 may (i) obtain a start position and a stop position for an individual of the individuals, (ii) obtain a trained inferenced model, (iii) obtain an inferred path for the individual, (iv) make a determination whether the individual is following the inferred path, and/or (v) manage resource prioritization of the limited hardware resources for the individual.

When performing its functionality, security manager 101 may perform all, or a portion, of the methods and/or actions shown in FIGS. 2A-4B.

Position sensors 103 may include any number of position sensors (e.g., 103A-103N). For example, position sensors 103 may include one position sensor (e.g., 103A) or multiple position sensors (e.g., 103A-103N) that may independently and/or cooperatively facilitate identification of the individuals and/or locations of the individuals.

All, or a portion, of position sensors 103 may provide computer-implemented services to users and/or other computing devices operably connected to position sensors 103. The computer-implemented services may include any type and quantity of services including, for example, identifying of locations of individuals at various points in time. Different position sensors may provide similar and/or different computer-implemented services.

To provide their functionality, position sensors 103 may (i) obtain position data for any number of individuals traversing through the environment between a start position and a stop position, (ii) obtain an identifier for an individual (e.g., to identify a start position), and/or (iii) provide the position data and/or the identifier to other entities such as security manager 101.

In an embodiment, any of position sensors 103 are implemented using, for example, radio frequency tag identifiers (e.g., that may read tickets or other person-carried items), cameras (e.g., video/picture cameras implemented with various optical sensors), and/or other types of devices that may be used to identify the locations of individuals within an environment.

When performing its functionality, any of position sensors 103 may perform all, or a portion, of the methods and/or actions shown in FIGS. 2A-4B.

Security manager 101 and/or positions sensors 103 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 6.

Any of the components illustrated in FIG. 1 may be operably connected to each other (and/or components not illustrated) with a communication system 102. In an embodiment, communication system 102 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
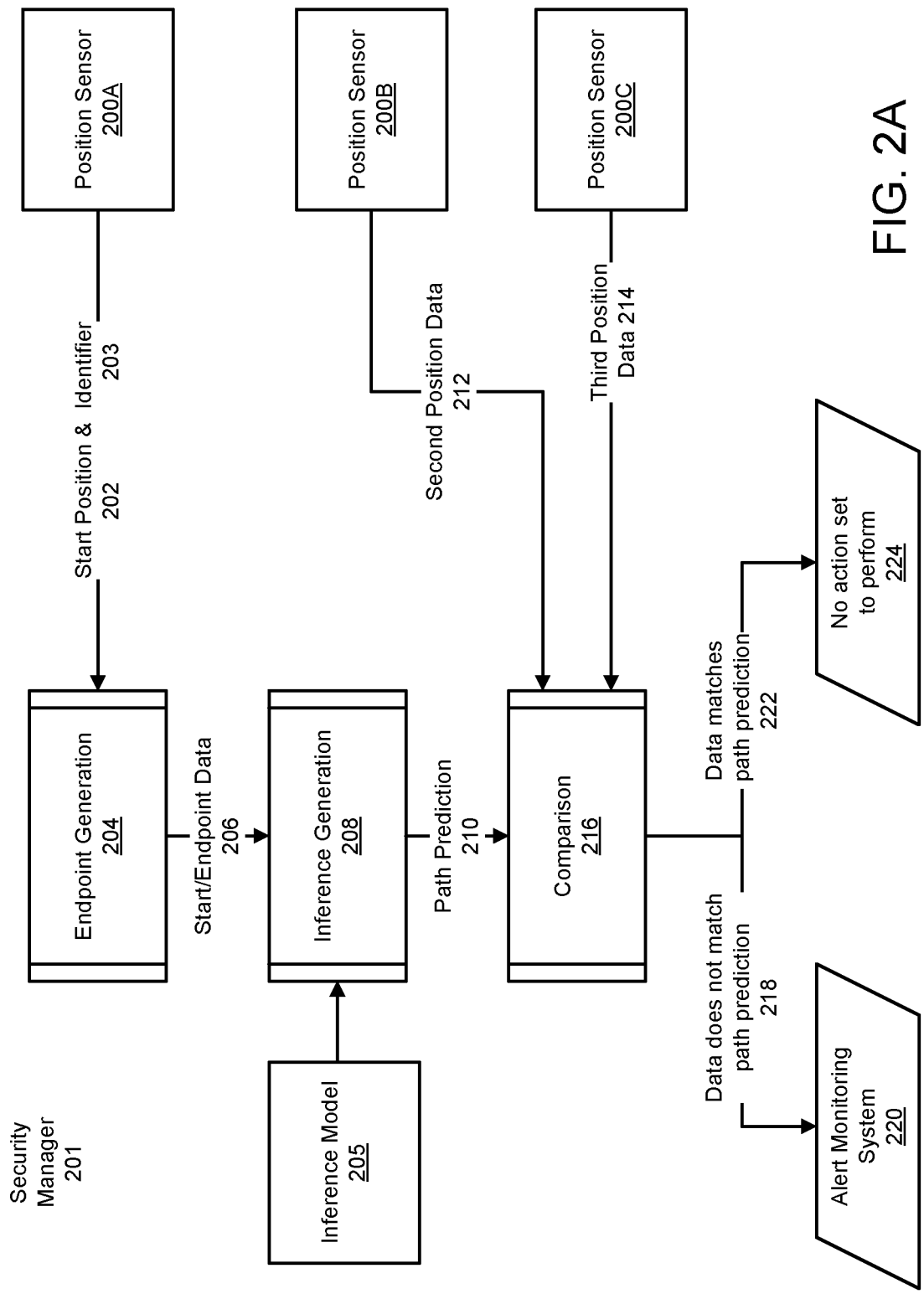
FIG. 2A shows a data flow diagram illustrating a first data flow in accordance with an embodiment.

To further clarify embodiments disclosed herein, data flow diagrams in accordance with an embodiment are shown in FIGS. 2A-2B. The data flow diagrams may illustrate how data is obtained and used within the system of FIG. 1.

Turning to FIG. 2A, a data flow diagram illustrating a first data flow in accordance with an embodiment is shown. In FIG. 2A, security manager 201 may be similar to security manager 101, and position sensors 200A-200C may be similar to any of position sensors 103. In FIG. 2A, security manager 201 and position sensors 200A-200C may be connected to each other via a communication system (not shown). Communications between security manager 201 and position sensors 200A-200C are illustrated using lines terminating in arrows.

As discussed above, security manager 201 may perform computer-implemented services by prioritizing limited hardware resources based on abnormal behaviors of individuals. The limited hardware resources of the data processing systems may be limited due to limited available storage to host live position data of multiple individuals and/or limited processing capability for timely identification of an individual posing a security risk.

In order to provide security management services in a manner that reduces the quantity of hardware resources necessary to provide the security management services, security manager 201 may obtain start position 202 and identifier 203 for an individual traversing through an environment, and generate an inferred path of the individual that is likely to traverse based on start position 202 and identifier 203 (which may be used to identify a stop position, and the start/stop positions may be used to infer the path). By doing so, security manager 201 may make a determination regarding whether an individual is following the inferred path (e.g., inference generated 208) and manage security risk based on the identified individual posing a security risk.

To generate the inferences, an inference model 205 may be obtained. Inferences (e.g., indicating the paths that an individual is likely to follow) may be obtained using inference model 205. Inference model 205 may be trained to generate inferences (e.g., as part of inference generation 208) indicating typical paths (e.g., as part of path prediction 210) of individuals traversing through an environment. Refer to FIG. 2B-3E for additional details regarding obtaining an inference model.

Prior to obtaining an inference, start position 202 and a stop position may be obtained.

Start position 202 (e.g., for an individual) may be obtained from position sensor 200A. Start position 202 may indicate a first location where the individual is located in an environment at a first point in time. A start position for an individual may be obtained from any number of position sensors within an environment (e.g., positions sensors 200A-200C).

To obtain a stop position for the individual, identifier 203 may be obtained to endpoint generation 204 process. To perform endpoint generation 204 process identifier 203 may be obtained from any of the position sensors (e.g., 200A-200C) and/or other devices not shown in FIG. 2A. Identifier 203 for the individual may include any type of information usable to identify a stop position for the individual.

For example, in the context of an airport environment, the identifier may be a code obtained from a ticket issued to the individual. The code (e.g., a data structure) may be usable to identify a gate through which the individual is presumed to depart from the airport. The gate may be the stop position. The code may include any type and quantity of data usable to, for example, perform a lookup in a database which associates the code with gates and/or the individual. Consequently, using the code to perform the lookup may provide a stop position for the individual. While described with respect to an airport environment and codes, the environments may be other types of environments and the identifiers used to identify stop locations may be other types of data without departing from embodiments disclosed herein.

While not explicitly shown in FIG. 2A, identifier 203 may be obtained, for example, using radio frequency tag (RFID) identifiers (e.g., that may be included in tickets or other person-carried items thereby allowing for position sensors— which may include an RFID tag reader—to obtain the identifiers from the RFID tags), cameras (e.g., video/picture cameras implemented with various optical sensors), and/or other types of devices that may be used to identify the locations of individuals within an environment.

The stop position for the individual may be obtained based on start position 202 and/or identifier 203. The stop position may indicate a final location where the individual is likely to be located in an environment at a second point in time (e.g., sometime after the first point in time associated with start position 202), such as a gate leading to a plane on which the individual is scheduled to depart for airport environments.

As part of endpoint generation 204 process, start/endpoint data 206 may be obtained. Start/endpoint data 206 may include start position 202 and the stop position for the individual.

To identify a typical path for the individual, start/endpoint data 206 may be used in inference generation 208 process. Inference generation 208 process may include ingesting start position 202 and/or the stop position into an inference model (e.g., 205). The inference model result (i.e., an inference such as path prediction 210) may be used to make a determination regarding whether the individual is following a typical path through the environment.

For example, to ascertain whether the individual is following the typical path, second position data 212 for the individual. Second position data 212 may indicate a second location of the individual within the environment at a third point in time. For example, in the context of an airport environment, after a passenger is ticketed (e.g., and when the start/stop positions are identified) the passenger may begin walking within the environment. Position sensors (e.g., 200A-200C) may track the passenger within the environment thereby providing the second location at the third point in time.

Likewise, third position data 214 for the individual may also be obtained. Third position data 214 may indicate a third location of the individual within the environment at a fourth point in time. When providing its functionality, security manager 201 may use and/or obtain supplementary position data (e.g., second/third locations) for an individual from any number of position sensors in the environment (e.g., position sensors 200A-200C).

To make a determination regarding whether the individual is following the typical path through the environment, second position data 212 and/or third position data 214 may be used. The second/third position data 212, 214 may be used as part of comparison 216 process to make the determination. Comparison 216 process may identify, for example, whether second/third position data 212, 214 are aligned with the typical path (e.g., path prediction 210) for the individual and/or meet traversal timing expectations for the typical path. The comparison may define whether the individual is following the typical path.

For example, comparison 216 process may be performed by comparing path prediction 210 to second/third position data 212, 214. If the comparison indicates disagreement between the prediction and the locations (e.g., that data does not match path prediction 218), then the data flow may proceed to perform an alert monitoring system 220 action. In contrast, if the comparison indicates agreement between the prediction and the locations (e.g., that data matches the path prediction 222), then the data flow may proceed to not perform any actions (e.g., 224) responsive to comparison 216 process.

To perform an alert monitoring system 220 action, resources may be by prioritized for monitoring the individual identified by identifier 203 (e.g., a "suspect individual"). For example, additional resources for analyzing video of the suspect individual to identify the actions performed by the suspect individual. The additional resources may be used to perform more complicated and/or more nuanced algorithms that may extract additional information from the video at the cost of additional computing resource expenditures.

When a no action set to perform 224 action is performed, no additional computing resources may be allocated for monitoring of the individual and/or an existing level of computation resource allocation for monitoring the individual may be decreased. For example, resources allocated for analyzing video of the suspect individual to identify the actions performed by the suspect individual may be deallocated and reallocated to analyzing video of other individuals. In another example, a position sensor allocated for tracking the activities of a suspect individual may be deallocated and released to a pool of allocatable resources.

As shown in the data flow illustrated in FIG. 2A, while operating, the system of FIG. 1 may dynamically reallocate limited computing resources for surveilling and analyzing the activities of individuals in various environments. As part of the processing of surveilling and analyzing the activities of the individuals, inferences may be generated. As discussed above, the inferences may be obtained using trained machine learning models (discussed further with respect to FIG. 2B-2C).

Turning to FIG. 2B, a data flow diagram showing inference model training in accordance with an embodiment is shown. As discussed above, trained machine learning models (and/or other types of inference generating models) may be used to obtain inferences. In FIG. 2B, various actions for training models are illustrated. Specifically, as illustrated in FIG. 1, machine learning models may be trained to obtain inference models usable to perform, at least in part, the data flow shown in FIG. 2A.

With reference to FIG. 2A, inference model 205 may be obtained and used as part of the data flow. Security manager 201 may obtain inference model 205 using a variety of processes (e.g., generation, acquisition from another entity, etc.). For example, in a first scenario, security manager 201 may obtain inference model 205 from an external entity through a communication system (e.g., communication system 102). However, in a second scenario, inference model 205 may be generated by security manager 201 using training data 232.

Training data 232 may include data usable to train a machine learning model and/or any other type of inference-generation models (e.g., regression model, tree-based models, etc.). To obtain a trained machine learning model, training data 232 may be ingested by one or more predictive algorithms including, but not limited to, artificial neural networks, decision trees, support-vector machines, regression analysis, Bayesian networks, and/or genetic algorithms to generate an inference model. The inference model may be generated via other methods without departing from embodiments disclosed herein.

Trained inference model 205 may generate inferences indicating typical paths of individuals traversing through an environment from a start position to an end position within a time interval. To train an inference model to obtain trained inference model 205, training data 232 may first be obtained from various sources throughout an environment (e.g., position sensors 200A-200C). Training data 232 may include a series of locations over a period of time for one or more individuals residing within an environment. The locations over time may define paths (e.g., typical paths of individuals) and the period of time may indicate pacing of the individuals along the typical paths (e.g., within an interval of time).

To obtain training data, a training data generation 230 process (discussed further with respect to FIG. 2C) may be performed. Training data generation 230 process may include obtaining a set of position-time intervals for one or more individuals traversing through an environment. Training data generation 230 process may also include ingesting position data 226 and schedule data 228 to generate a relationship between locations of the individuals over the time interval.

Thus, training data generation 230 process may result in the generation of training data 232. Accordingly, an inference model may be trained using the training data to predict typical paths for individuals based on start/stop position pairs for the individuals.

To obtain trained inference model 205, inference model training 234 process may be performed. Inference model training 234 process may include ingesting training data 232 into a machine learning model (e.g., a deep learning model or other type of model). Once ingested, the weights and structure of the machine learning model may be adapted (e.g., values for nodes of intermediate layers may be selected, connections may be pruned/added, etc.) to generate inferences based on the start/stop pair of individuals within an environment.

Accordingly, the obtained trained inference model 205 may be used, as part of the data flow shown in FIG. 2A, to prioritize resources to manage security risks within an environment.

Figure 2C:
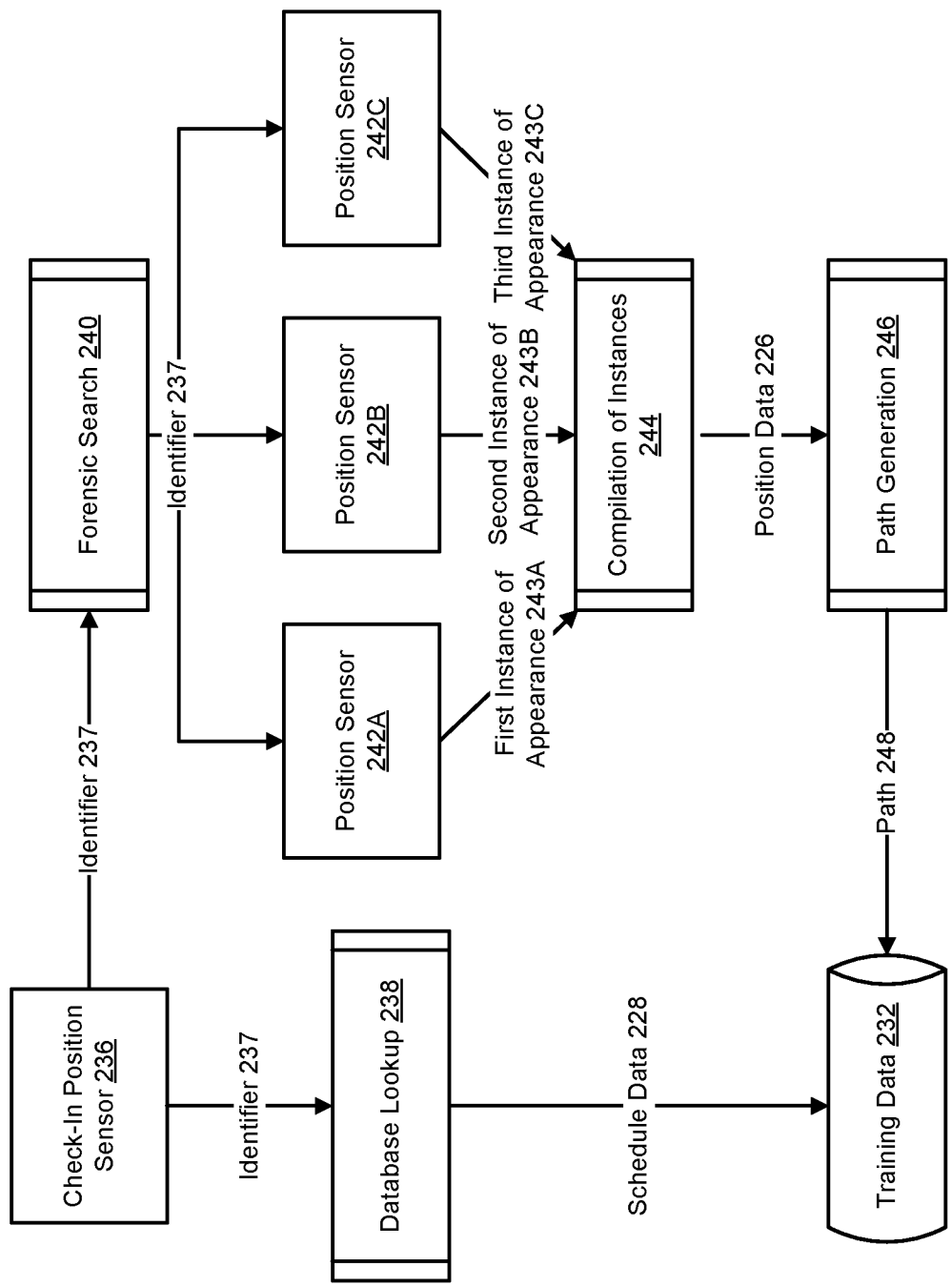
FIG. 2C shows a data flow diagram showing training data generation in accordance with an embodiment.

Turning to FIG. 2C, a data flow diagram showing a training data generation (e.g., 230) process in accordance with an embodiment is shown. As discussed above, trained machine learning models (and/or other types of inference generating models) may be used to obtain inferences. In FIG. 2C, various actions for obtaining training data, to train an inference model, are illustrated. Specifically, as illustrated in FIG. 1 and mentioned with regard to FIG. 2B, machine learning models may be trained to obtain inference models usable to perform, at least in part, the data flow shown in FIG. 2A.

With reference to FIG. 2B, training data 232 may be obtained and used as part of the data flow. Security manager 201 may obtain training data 232 using a variety of processes (e.g., generation, acquisition from another entity, etc.).

To obtain training data 232, position data 226 and schedule data 228 must first be obtained (mentioned previously and discussed below).

To obtain position data 226 and schedule data 228, training data generation 230 process may include obtaining locations of multiple individuals within an environment at a point in time from one or more position sensors (e.g., position sensors 200A-200C).

To obtain schedule data 228, position sensors located within the environment may collect (i) a first position of an individual at a first point in time (e.g., a start position from check-in position sensor 236) and (ii) an identifier (e.g., 237) for the individual. Identifier 237 may include any type of information usable to identify the individual and/or a stop position (a "presumed stop position") for the individual. Identifier 237 may include a code (e.g., a data structure) that includes data usable to perform a lookup in a database (e.g., database lookup 238) which associates the code with the stop position and/or the individual.

For example, in the context of an airport environment, identifier 237 may be obtained using a radio frequency identification (RFID) tag associated with a ticket (e.g., which may include the RFID tag) issued to a passenger. The RFID tag for the passenger may include a code which may be useable to identify a gate through which the passenger is presumed to depart from the airport (e.g., a stop position). A position sensor located within the environment may include an RFID tag reader which may receive a transmission of data (e.g., identifier 237) from the RFID tag (e.g., when the passenger is within range of the position sensor). The code collected from the RFID reader may be used to perform a lookup in the database (e.g., database lookup 238) associated with the gates and/or the passenger. Using the code to perform database lookup 238 may provide the stop position for the passenger (e.g., the gate location).

To obtain position data 226, position sensors located within the environment may collect sensor data, the sensor data including a second position of the individual at a second point in time and/or a third position of the individual at a third point in time (and/or any number of position/time pairs). To further obtain position data 226, a forensic search (e.g., 240) of the sensor data may be performed. Forensic search 240 may be used to identify instances of appearances in which the position sensors are able to identify the individual (using identifier 237) at various locations in the environment at varying points in time. The instances of appearances may be timestamped based on the varying points in time.

For example, in the context of an airport environment and as part of forensic search 240, position sensor 242A may collect first instance of appearance 243A, in which the individual is identified at a location an amount of time after being identified at check-in position sensor 236. Subsequently, position sensor 242B may collect second instance of appearance 243B in which the individual is identified at a location an amount of time after being identified by position sensor 242A, and position sensor 242C may collect third instance of appearance 243C in which the individual is identified at a location an amount of time after being identified by position sensor 242B.

Forensic search 240 may be performed in real-time as traversal is performed by the individual, and/or may be performed based on a database of sensor data that has been recorded previously.

As the instances of appearances are collected, a compilation of the instances (e.g., 244) may be performed. The compilation may cause the instances to be stored in a database to be used during path generation 246. By compiling the instances, and corresponding timestamps, position data 226 may be obtained.

Figure 4B:
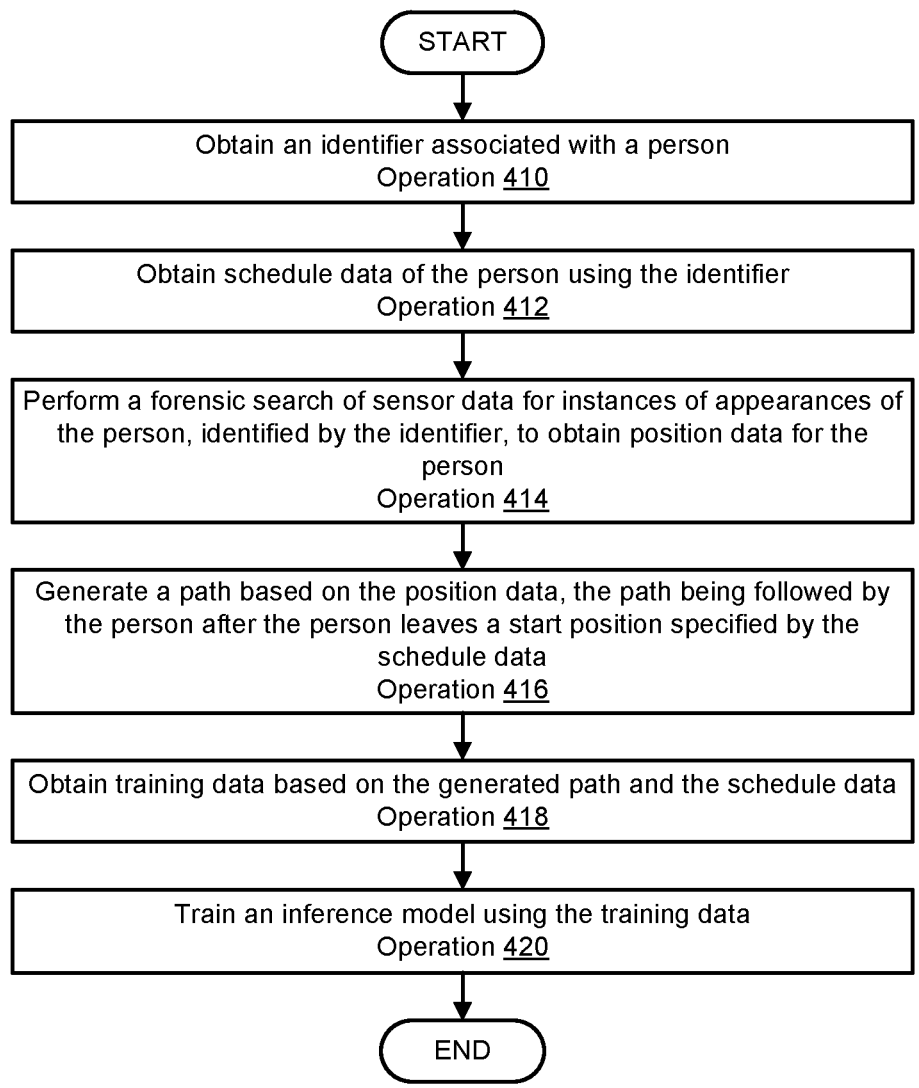
FIG. 4B shows a flow diagram illustrating a method of training data generation to train an inference model in accordance with an embodiment.

Using position data 226, path generation 246 may be performed (discussed further with respect to FIG. 4B). Path generation 246 may utilize position data 226 based on the corresponding timestamps of position data 226 to obtain path 248. Path 248 may be a path in which the individual may follow when traversing through the environment. Path 248 may not only indicate when the individual is identified by position sensors but may indicate how much time traversal took between locations in which the individual is identified by the position sensors.

By obtaining schedule data 228 and path 248, training data 232 may be obtained, training data 232 being a collection of data including schedule data 228 with corresponding paths (e.g., path 248).

Accordingly, the obtained training data 232 may be used, as part of the data flow shown in FIG. 2B, to train inference model 205.

To further clarify embodiments disclosed herein, an example implementation in accordance with an embodiment is shown in FIGS. 3A-3E. These figures show diagrams illustrating a security management process that may reduce the quantity of hardware resources necessary to provide security management services. FIGS. 3A-3E may show diagrams of an example process for training data generation used to train an inference model to determine whether an individual is following a typical path within an environment in accordance with an embodiment. While described with respect to security management services, it will be understood that embodiments disclosed herein are broadly application to different use cases as well as different types of data processing systems than those described below.

Turning to FIGS. 3A-3E, consider a scenario in which an airport includes video surveillance cameras (e.g., limited hardware resources located within an environment). The cameras may be configured to visually identify one or more individuals within an environment. The video surveillance cameras may collect position data (e.g., location points and timestamps of corresponding points in time) for the individuals traversing through an environment and send the position data to a security system (e.g., a computer operating system) to utilize the position data in order to generate a path traversed by an individual (e.g., a typical path, as discussed previously). Decisions concerning how to prioritize the limited hardware resources (e.g., by devoting more of the camera time to tracking the activities of the individuals, by initiating performance of various types of analysis of the activities, etc.) may be determined based on the typical path of the individual.

Figure 3A:
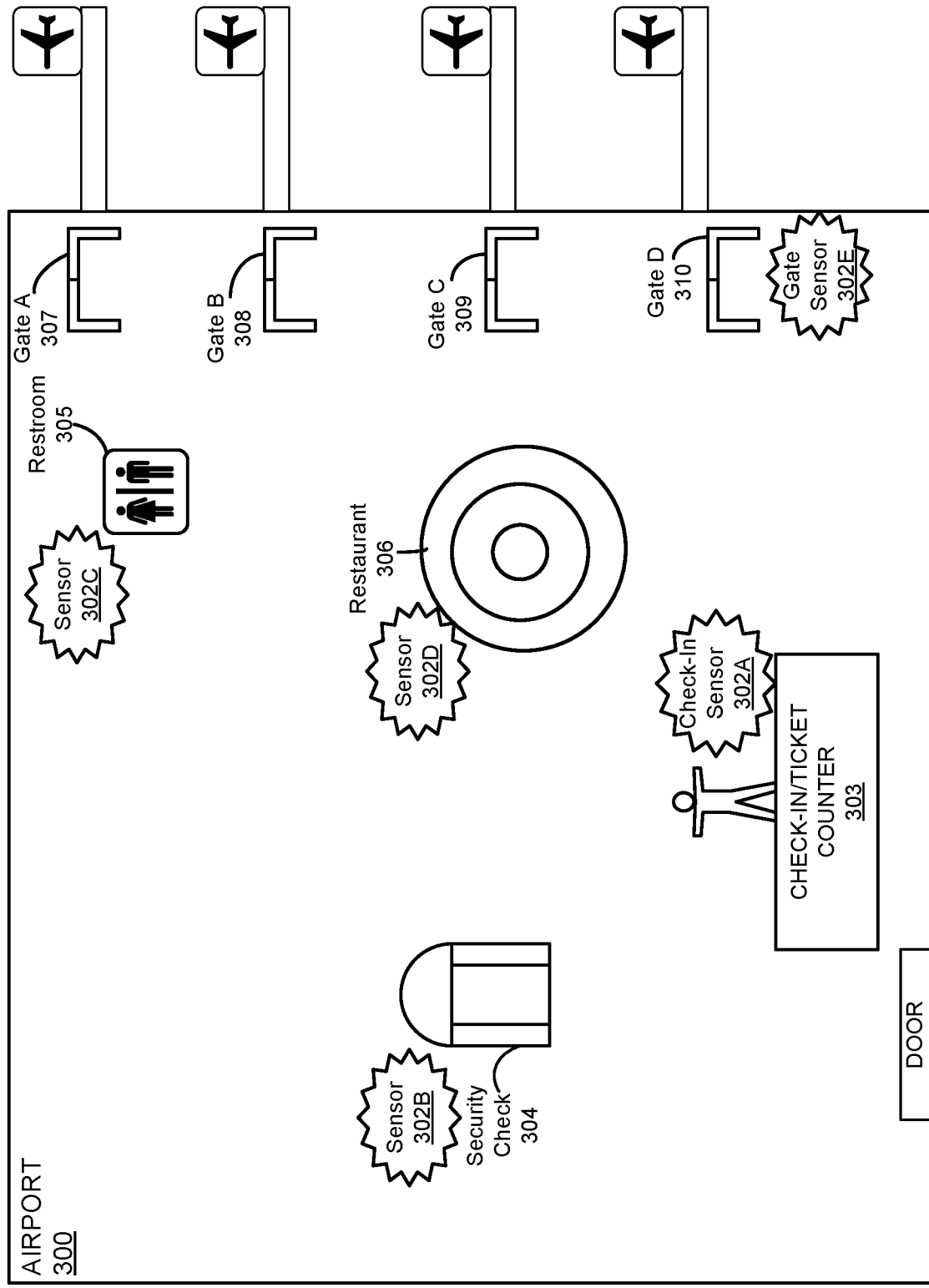
FIG. 3A-3E shows diagrams illustrating training data generation in accordance with an embodiment.

As shown in FIG. 3A, an individual, named Rick, may be scheduled for a flight departing from airport 300 (e.g., George Bush Intercontinental/Houston Airport). Rick is scheduled to begin boarding an airplane located at Gate D 310.

Airport 300 may include an environment that includes five positions sensors (e.g., sensors 302A-302E). Sensor 302A may identify Rick at a first location (e.g., check-in/ticket counter 303) within airport 300 at a first point in time (e.g., 5:15 am) when Rick checks in for his flight at the ticket counter. Rick may receive a ticket for the flight and the ticket may include an identification (e.g., an identifier as discussed previously) associated with Rick and/or Rick's final destination within the airport (e.g., Gate D 310 at an 7:30 am departure time). The first location and the final destination may be stored in a database. Rick may then be tracked by the five position sensors as discussed below.

Figure 3B:
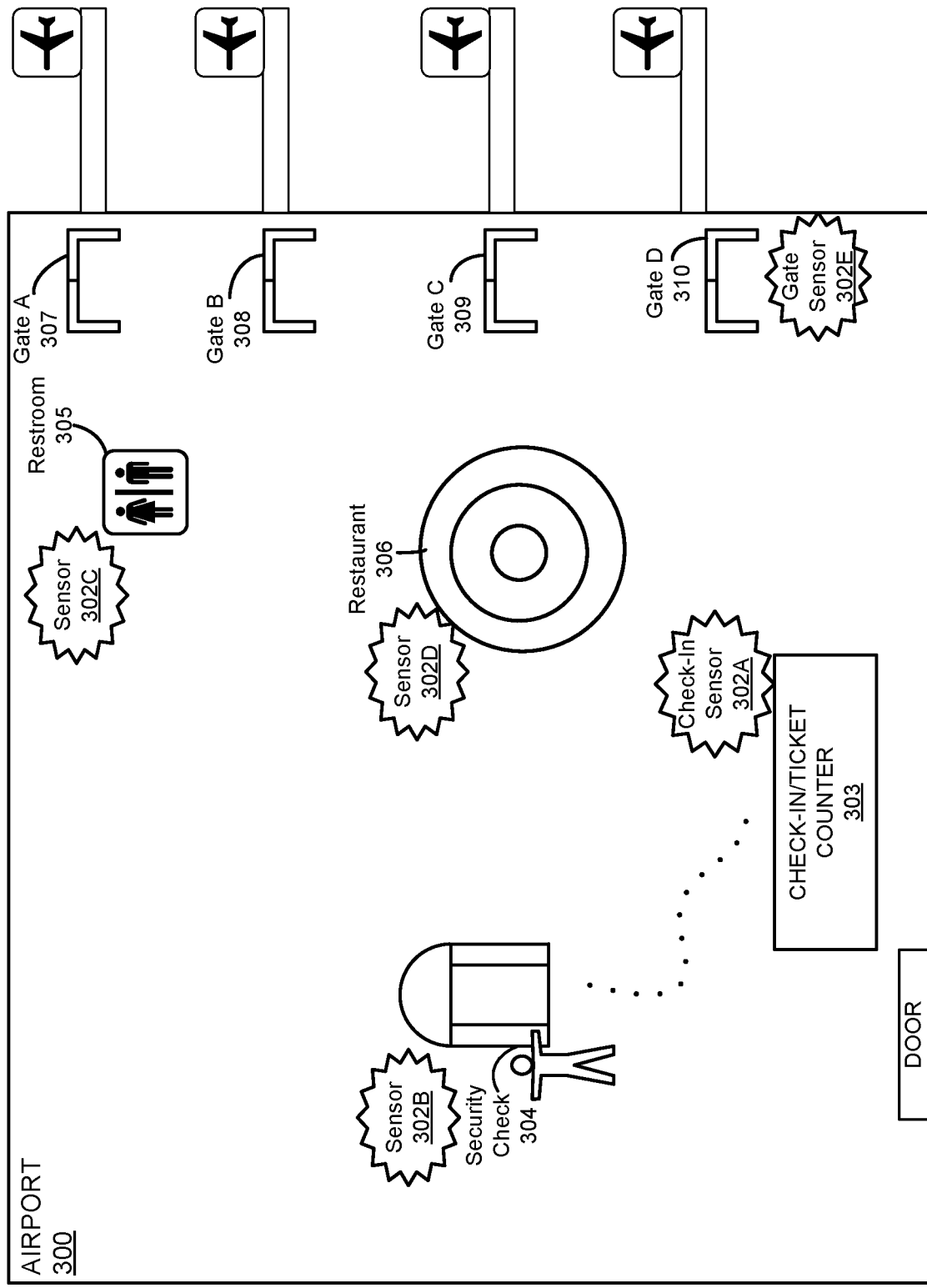

As shown in FIG. 3B, Rick moves away from check-in/ticket counter 303 after checking in to airport 300, Rick may traverse to security check 304 in order for airport security to check Rick's belongings for security risks in preparation for Rick's flight. While at security check 304, sensor 302B may identify Rick at a second location (e.g., security check 304) within airport 300 at a second point in time (e.g., 5:30 am). The second location may be stored similarly to the first location and the final destination.

Figure 3C:
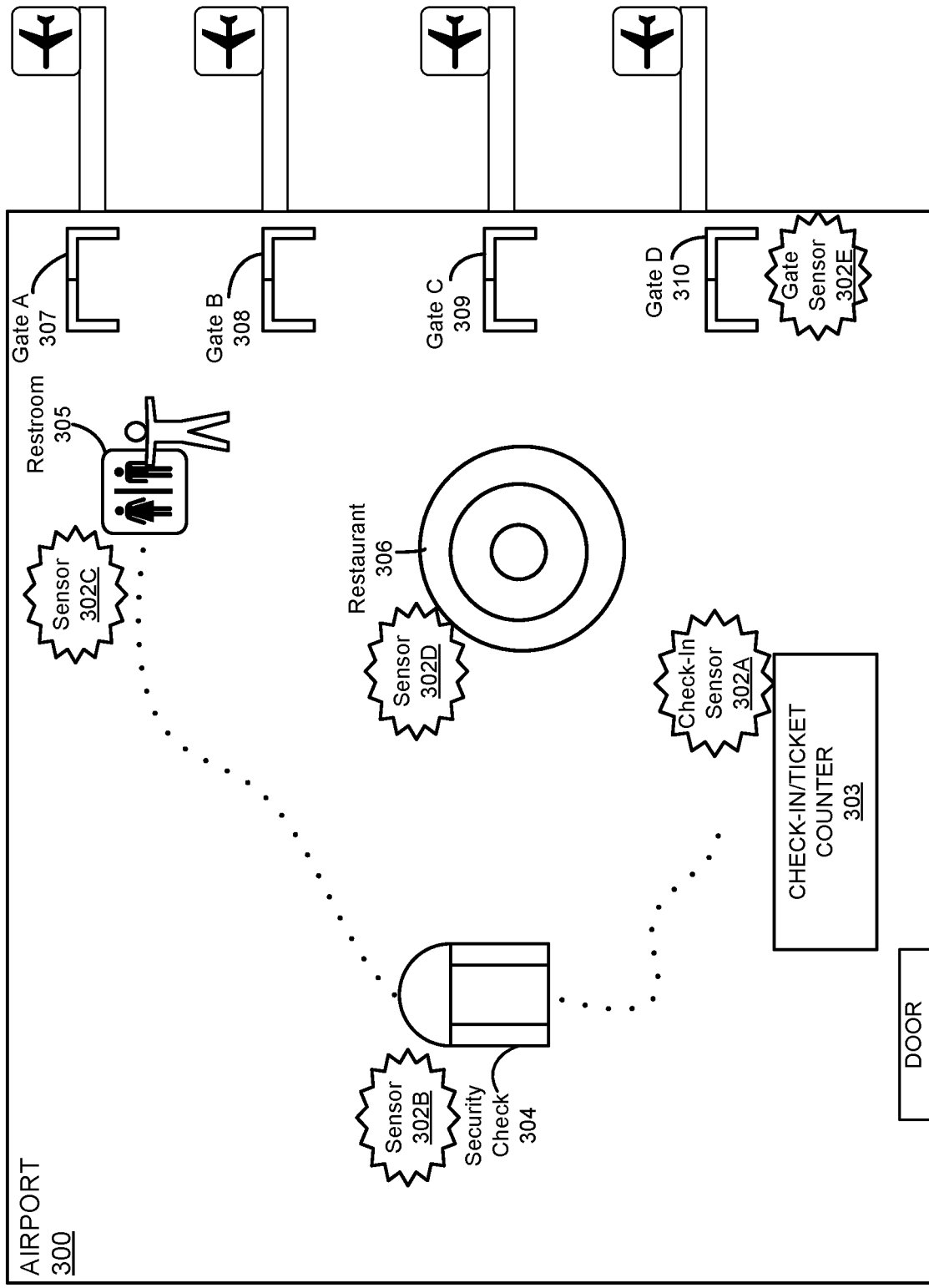

As Rick completes the security check, Rick may decide to take a restroom break before the flight. As shown in FIG. 3C, Rick may then traverse to restroom 305 where sensor 302C may identify Rick at a third location (e.g., restroom 305) within airport 300 at a third point in time (e.g., 6:00 am). The third location may be stored similarly to the second location.

Figure 3D:
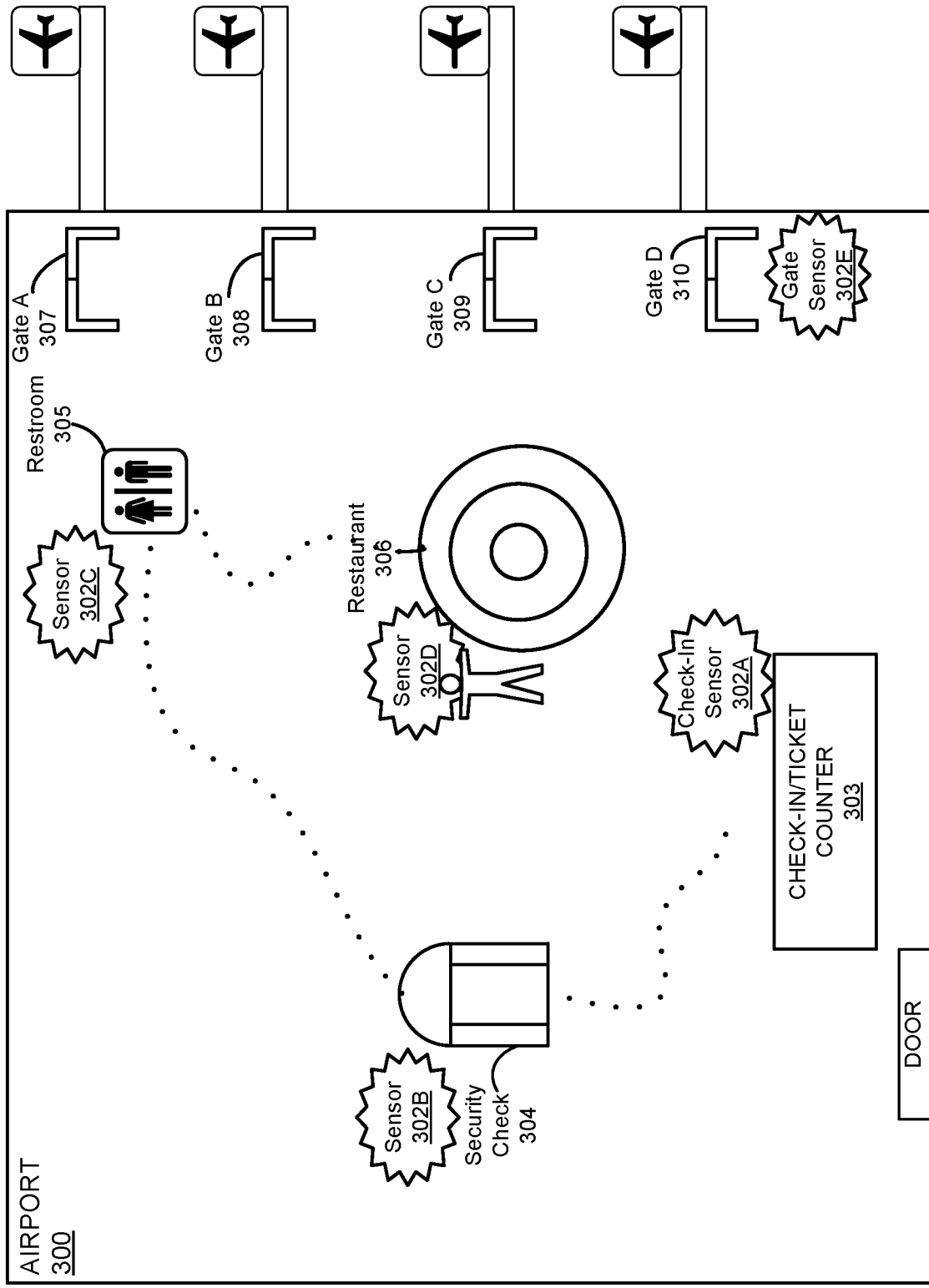

Upon exiting the restroom and as shown in FIG. 3D, Rick may decide to traverse towards restaurant 306 to grab breakfast before the flight. While at restaurant 306, sensor 302D may identify Rick at a fourth location (e.g., restaurant 306) within airport 300 at a fourth point in time (e.g., 6:10 am). This fourth location may also be stored in the database.

Figure 3E:
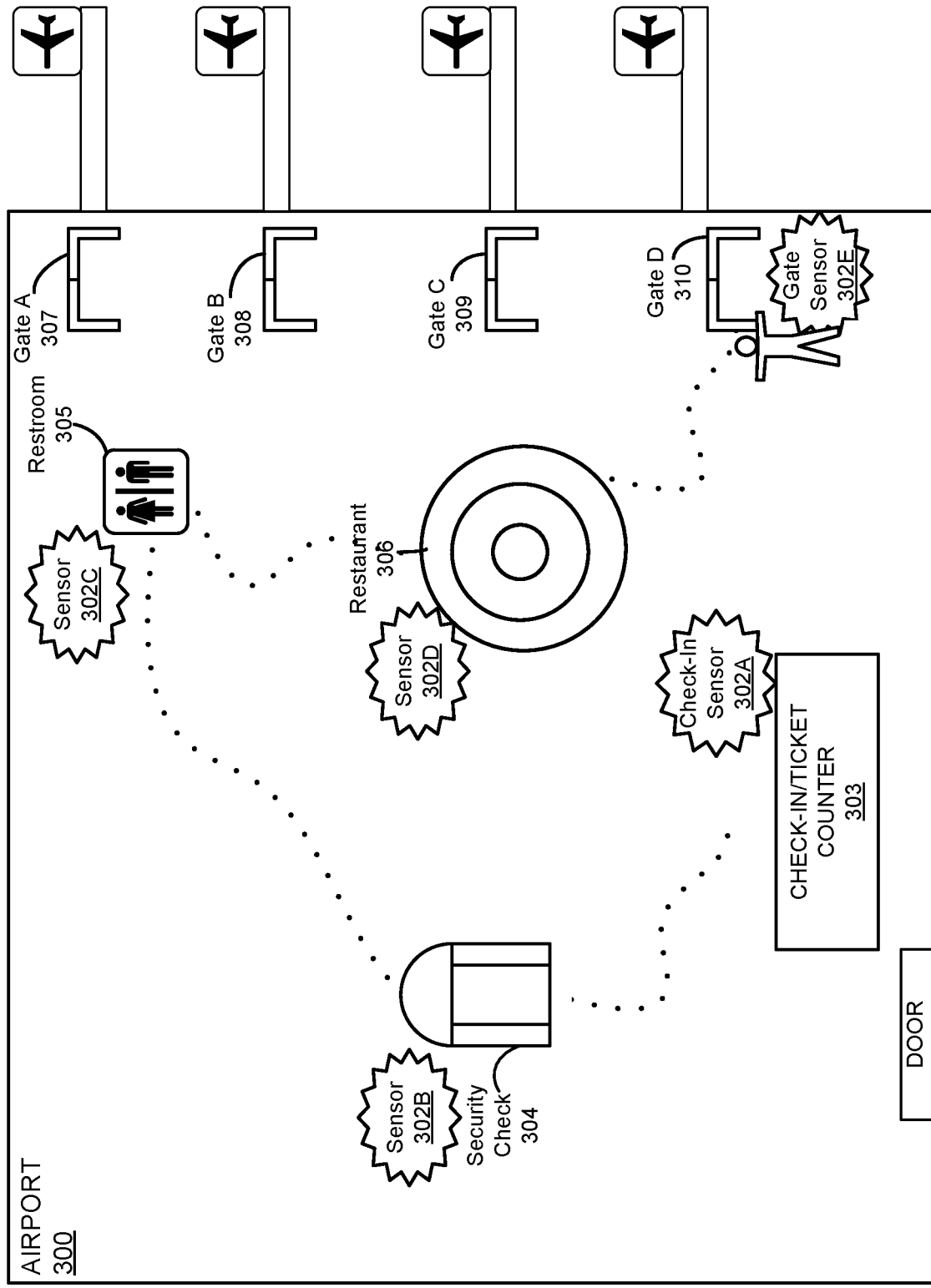

As the time for Rick's flight's departure draws near, Rick may traverse to Gate D 310, as shown in FIG. 3E. When Rick traverses near Gate D 310, sensor 302E may identify Rick at a fifth location (e.g., Gate D 310) within airport 300 at a fifth point in time (e.g., 7:20 am).

The dotted lines in FIGS. 3A-3E are representative of Rick's traversal through airport 300. Using the stored locations and corresponding points in time (e.g., schedule data and/or position data, discussed previously), a path may be generated (as discussed with respect to FIG. 2C) to be associated with the information on Rick's ticket (e.g., schedule data for Rick). This path may indicate an amount of time that traversal takes between locations and may be placed in a database with associated schedule data to be used as training data.

In this way, training data is generated. Any number of individuals may be tracked, similarly to how Rick is tracked in the example illustrated by FIGS. 3A-3E, to generate a multitude of data to be used as training data. This training data may then be used to train an inference model. By doing so, a typical path of an individual may be predicted with a high level of confidence by the inference model.

As discussed above, the components of FIGS. 1-2B may perform various methods to provide security management services in a manner that reduces the quantity of hardware resources necessary to provide the security management services. FIGS. 3A-3E illustrate example implementations, and FIGS. 4A-4B illustrate methods, that may be performed by the components of FIGS. 1-2B. In the diagrams discussed below and shown in these figures, any of the operations may be repeated, performed in different orders, omitted, and/or performed in parallel with or a partially overlapping in time manner with other operations.

Turning to FIG. 4A, a flow diagram illustrating a method of prioritizing limited computing resources based on behaviors of individuals in accordance with an embodiment is shown. The method may be performed, for example, by a data processing system, a security manager, a communication system, position sensors, and/or other components illustrated in FIGS. 1-2B.

Prior to operation 400, a data processing system may have obtained a trained inference model. The trained inference model may have been obtained through various processes such as generation, acquisition from external entity, and/or by any other method. The trained inference model may have been trained to generate inferences indicating typical paths through an environment in which multiple individuals follow between a start position and a stop position. The trained inference model may be obtained via the method illustrated in FIG. 4B.

At operation 400, a start position and a stop position for an individual may be obtained. The start position and the stop position for the individual may be obtained by (i) reading them from storage, (ii) receiving them from another device, and/or (iii) via generation.

The start position and the stop position may be received from another device by (i) requesting them from the device and receiving them in a message that is responsive to the request, (ii) receiving them in unprompted messages from the device, and/or (iii) via other methods.

For example, a position sensor may be programmed to automatically send frames of video in which an individual is depicted to an analysis service (e.g., a computer vision based analysis service) that identifies the location of the individual in the video frames. The location of the individual may then be automatically provided to other entities such as, for example, security manager 201. A start position may be obtained in this manner. Also, a stop position may be obtained, for example, by performing a lookup based on an identity of person made using the video frames.

The start position and stop positioned may be obtained via generation by obtaining an identifier for an individual (e.g., from a ticket) and using the identifier to obtain the stop position of the individual. For example, a position sensor may be programmed to automatically obtain a first location of an individual within an environment and an identifier, such as an identification number associated with the individual. The location of the individual and the identifier may then be automatically provided to another device (e.g., a computer operating system) that obtained a stop position of the individual based on the first position and the identifier for the individual.

At operation 402, an inference for the individual may be obtained using an inference model, a start position, and a stop position for the individual. The inference may indicate typical paths through an environment in which the individual resides. The inference for the individual may be obtained by (i) receiving them from another device, and/or (ii) via generation.

A typical path may indicate any number of location ranges and corresponding time ranges which the individual must be within to be considered normal. For example, the typical path may specify three points within an environment and three corresponding points of time. The typical path may also specify corresponding distance variations from the three points in the environment, and three variations from the points in time. These points and variations may be used to evaluate whether an individual is on a typical path, or has diverged from the typical path when the individual is believed to be traveling from a start to a stop position interconnected by the typical path. The evaluation process is discussed in greater detail below.

The inference may be obtained via generation by (i) ingesting the start position and the stop position into the inference model, and (ii) the inference model generating the inference based on the start position and the stop position. Refer to FIG. 4B for additional information regarding obtaining an inference model.

At operation 404, it is determined whether the individual is following a typical path of the typical paths through the environment between the start position and the stop position. The determination may be made by comparing the typical path to a live path of the individual. The live path may be obtained using information obtained using position sensors. The live path may be determined to follow the typical path if the live path is within location ranges and time ranges specified by the typical path. If the live path follows the typical path, then it may be determined that the individual is following the typical path. Otherwise, it may be determined that the individual is not following the typical path.

If the individual is following the typical path, then the method may proceed to operation 406. If the individual is not following the typical; path, then the method may proceed to operation 408.

At operation 406, a resource prioritization of limited computing resources for the individual is retained or decreased. The limited computing resources prioritization may be retained or decreased by maintaining and/or decreasing (i) the quantity of position sensors used to track an individual and/or (ii) the quantity of position data collected and analyzed for an individual. Decreasing the quantity of position sensors used and/or the quantity of position data collected and analyzed may include increasing the quantity of position sensors available to collect position data.

For example, an individual is traversing through an environment between a start/stop position. A typical path that the individual may follow (based on the start/stop position) may include five location points corresponding to a point in time. If the individual is located, via position sensor, at the second location point at the corresponding point in time, at least one or more position sensors (e.g., video cameras located in the environment) may decrease a frequency in collecting position data for the individual. Decreasing the frequency in collecting position data may include making one or more position sensors to become available for other tasks (e.g., collecting position data for another individual that poses a security risk).

The method may end following operation 406.

Returning to operation 404, the method may proceed to operation 408 following operation 404 when it is determined that the individual is not following the typical path.

At operation 408, a resource prioritization of limited computing resources for the individual is increased. The resource prioritization may be increased (i) by adjusting the quantity of surveillance devices (e.g., position sensors) used to track an individual and/or (ii) by adjusting the quantity of collection and analysis of position data for an individual. The adjustment of quantity of surveillance devices and/or the adjustment of collection and analysis of position data may include increasing the quantity of surveillance devices and/or increasing the collection and analysis of position data based on the security risk an individual poses (e.g., security risk levels). Security risk levels may indicate measurements of a security risk that an individual poses based on the likelihood of the individual performing an action and/or the negative impact(s) to occur if the individual were to perform an action.

For example, an individual is traversing through an airport starting at the ticket counter and stopping at gate B4 (e.g., start/stop position). A typical path of the individual would include the individual following a path comprising of five location points with five corresponding points of time. If the individual is located, via position sensor, at the fourth location point outside the corresponding point in time (e.g., at the point in time corresponding to the fifth location), a quantity of video cameras, located in the environment and used to track the individual, would minimally increase the surveillance of the individual (e.g., one or two additional video cameras may be directed to track the individual). If the individual is located, via position sensor, outside of all the five location points corresponding to the typical path, the quantity of video cameras used to track the individual would significantly increase (e.g., two or more video cameras may be directed to track the individual).

The method may end following operation 408.

Using the method illustrated in FIG. 4A, a system in accordance with an embodiment may improve the efficiency of use of limited computing resources by proactively identifying whether individuals are along paths that they are expected to be on. Consequently, the computing resources may be prioritized for analysis of individuals that are more likely to present an undesirable level of security risk.

Turning to FIG. 4B, a flow diagram illustrating a method of training data generation to train an inference model in accordance with an embodiment is shown. The method may be performed, for example, by a data processing system, a security manager, a communication system, position sensors, other components illustrated in FIGS. 1-2B, and/or other components not shown in FIGS. 1-2B.

At operation 410, an identifier associated with a person may be obtained. The identifier may be obtained by associating a data structure with the person. As discussed with respect to FIG. 2C, the identifier may include any type of information usable to identify the individual and/or a stop position (a "presumed stop position") for the individual. The identifier may include a code (an example data structure) that includes data usable to perform a database lookup which associates the code with the individual and/or associated information of the individual.

At operation 412, schedule data of the person may be obtained using the identifier. The schedule data may be obtained by performing a database lookup with the identifier to associate the person with the schedule data stored in the database. As discussed previously, schedule data may include a start position in which the person begins traversal of a path. The schedule data may be obtained (i) from being received by another device (e.g., position sensors), and/or (ii) via generation (e.g., lookups to obtain start/stop positions as mentioned above). The schedule data may be received from another device by (i) requesting them from the device and receiving them in a message that is responsive to the request, (ii) receiving them in unprompted messages from the device, and/or (iii) via other methods.

Additionally, the start position may be timestamped and stored as the person is identified at a first location (e.g., check-in/ticket counter 303 in FIGS. 3A-3E).

At operation 414, a forensic search of sensor data for instances of appearances of the person, identified by the identifier, may be performed to obtain position data for the person. The forensic search may be performed by collecting scenes from position sensors (e.g., images of the surrounding area) and using the identifier to identify the person within the scenes. These scenes may be previously collected before the forensic search is performed or may be collected as the forensic search is being performed.

As the person is identified within a scene of the scenes, position data may be obtained. The position data may be obtained by determining a location and time in which the scene depicts the identified person. The location and associated time may then be stored. By doing so, the position data may be obtained from sensor data from another device (e.g., position sensors), and/or (ii) via generation (e.g., lookups to obtain sensor data including scenes depicting the person). The position data may be received from another device by (i) requesting them from the device and receiving them in a message that is responsive to the request, (ii) receiving them in unprompted messages from the device, and/or (iii) via other methods.

For example, position sensors may obtain a location of an individual within an environment at a point in time and provide the location and time of the individual to an analysis device (e.g., a computer operating system) to track a path the individual is following through an environment. The position data may automatically be provided by the position sensors to the analysis device when the individual passes by the position sensors.

At operation 416, a path may be generated based on the position data, the path being followed by the person after the person leaves the start position specified by the schedule data. The path may be generated by a temporal ordering of the locations from the scenes based on the associated times of the locations in which the person is identified. For example, the path may be generated as a data structure indicating traversal times between locations in which the person is identified (e.g., a graph data structure).

At operation 418, training data may be obtained based on the generated path and the schedule data. Training data may be obtained by storing the schedule data as input data to be ingested by the inference model and storing the generated path as output data for the inference model to be trained to predict future paths based on an association between the schedule data and the generated path. Schedule data/generated path pairs such as this may be obtained for several individuals, thereby allowing a large accumulation of training data.

At operation 420, an inference model may be trained using the training data. The training data may be used to train the inference model by allowing the inference model to identify relationships between schedule data and associated generated paths of the training data.

For example, the training data may be ingested into a machine learning model (and/or other type of inference generation model) to train the inference model based on relationships between paths for multiple individuals defined by the position data and schedule data defined by the start position and stop position. By doing so, the trained inference model may generate inferences indicating typical paths through an environment in which the individual resides based on future schedule data (e.g., as ingest to the trained inference model).

The method may end following operation 420.

To further clarify embodiments disclosed herein, an example implementation in accordance with an embodiment is shown in FIGS. 5A-5D. These figures show diagrams illustrating a security management process that may reduce the quantity of hardware resources necessary to provide security management services. FIGS. 5A-5D may show diagrams of examples of processes for identifying whether an individual is following a typical path within an environment (e.g., a security risk) in accordance with an embodiment. While described with respect to security management services, it will be understood that embodiments disclosed herein are broadly application to different use cases as well as different types of data processing systems than those described below.

Figure 5A:
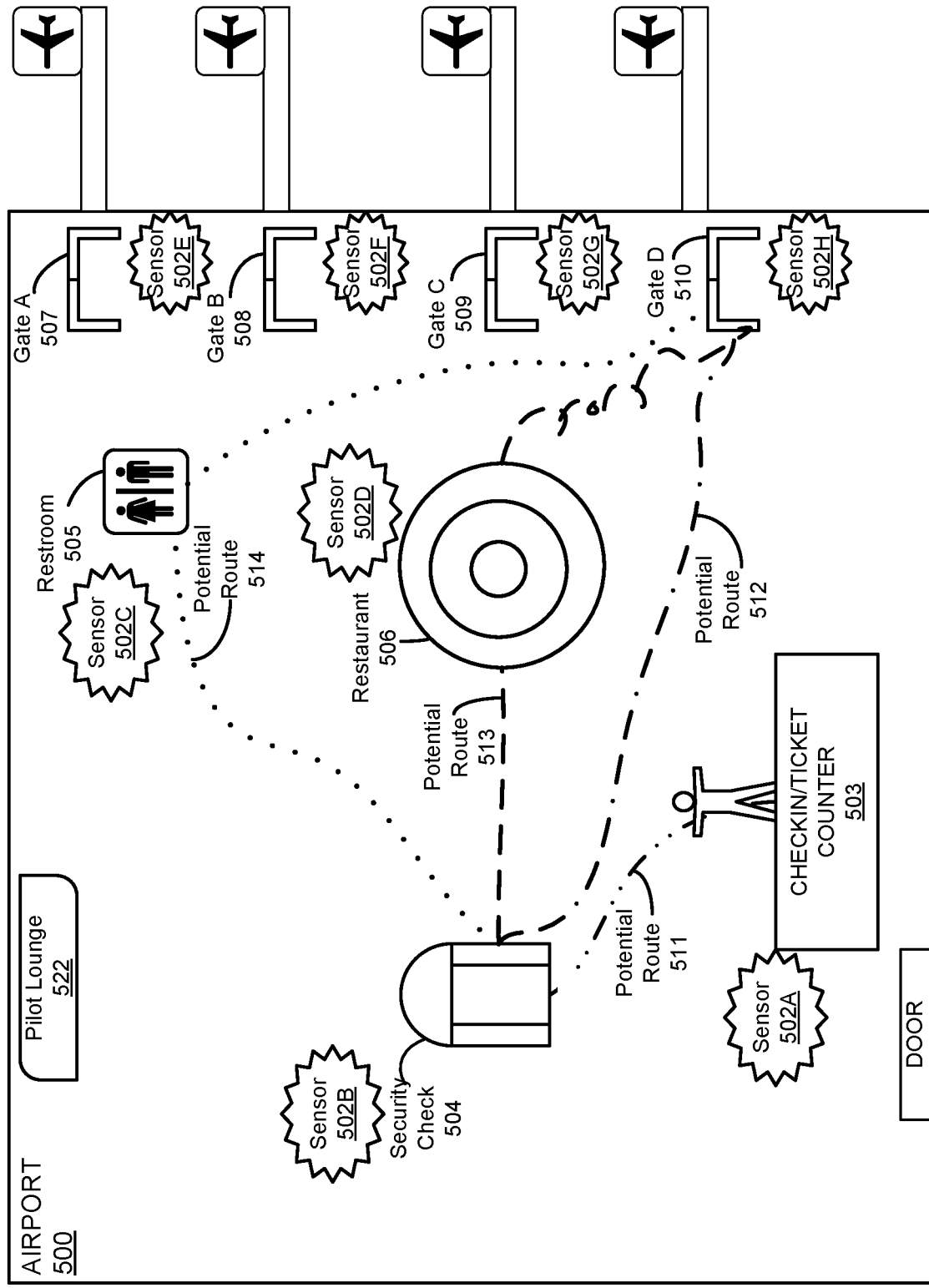
FIG. 5A-5E shows diagrams illustrating prioritization of limited computing resources based on abnormal behaviors of individuals in accordance with an embodiment.

Turning to FIG. 5A, consider a scenario in which an airport includes video surveillance cameras (e.g., limited hardware resources located within an environment). The cameras may be configured to visually identify one or more individuals within an environment that pose a security risk. The video surveillance cameras may collect position data (e.g., location points and corresponding points in time) for the individuals traversing through an environment and send the position data to a security system (e.g., a computer operating system) to analyze the position data in order to make decisions regarding whether an individual is a security risk (e.g., following a typical path) and/or how to prioritize the limited hardware resources (e.g., by devoting more of the camera time to tracking the activities of the individuals, by initiating performance of various types of analysis of the activities, etc.).

As shown in FIG. 5A, an individual, named Rick, may be scheduled for a flight departing from airport 500 (e.g., George Bush Intercontinental/Houston Airport) at 8:30 a.m. and arriving at another airport (e.g., Orlando International Airport) by 12:00 p.m. the same day. Rick is scheduled to beginning boarding an airplane located at Gate D starting at 8:00 a.m.

Airport 500 may include an environment that includes eight positions sensors (e.g., sensors 502A-502H). Sensor 502A may receive a first location (e.g., check-in/ticket counter 503) for Rick within the airport 500 at a first point in time (e.g., at 5:45 a.m.) when Rick checks in for his flight at the ticket counter. Rick may receive a ticket for the flight and the ticket may include an identification associated with Rick's final destination within the airport (e.g., Gate D 510). Based on the first location and the final destination, one or more potential routes (e.g., typical paths, discussed above) may be predicted for Rick to follow (e.g., potential routes 511, 512, 513, and 514).

The potential routes may include various normal paths that Rick may follow traversing from a start point (e.g., check-in/ticket counter 503) to a stop point (e.g., Gate D 510). Potential route 511, indicated by two dots separated by one dash, may identify a route between sensors 502A and 502B in which Rick may follow traversing from check-in/ticket counter 503 to security check 504. Potential route 512, indicated by two dashes separated by one dot, may identify a route between sensors 502B and 502H in which Rick may follow traversing from security check 504 to Gate D 510. Potential route 513, indicated by dashes, may identify a route between sensors 502B and 502H in which Rick may follow traversing from security check 504 to restaurant 506, and from restaurant 506 to Gate D 510. Potential route 514, indicated by equally spaced dots, may identify a route between sensors 502B, 502C, and 502H in which Rick may follow traversing from security check 504 to restroom 505, and from restroom 505 to Gate D 510.

In this example, the potential routes (e.g., 511, 512, 513, and 514) may be predicated using an inference model trained with training data associated with the environment of airport 500. However, potential routes at other airports may be predicated using an inference model trained with training data associated with the environment of the respective airport. A trained inference model may be obtained by methods illustrated in FIGS. 4A and 4B.

Figure 5B:
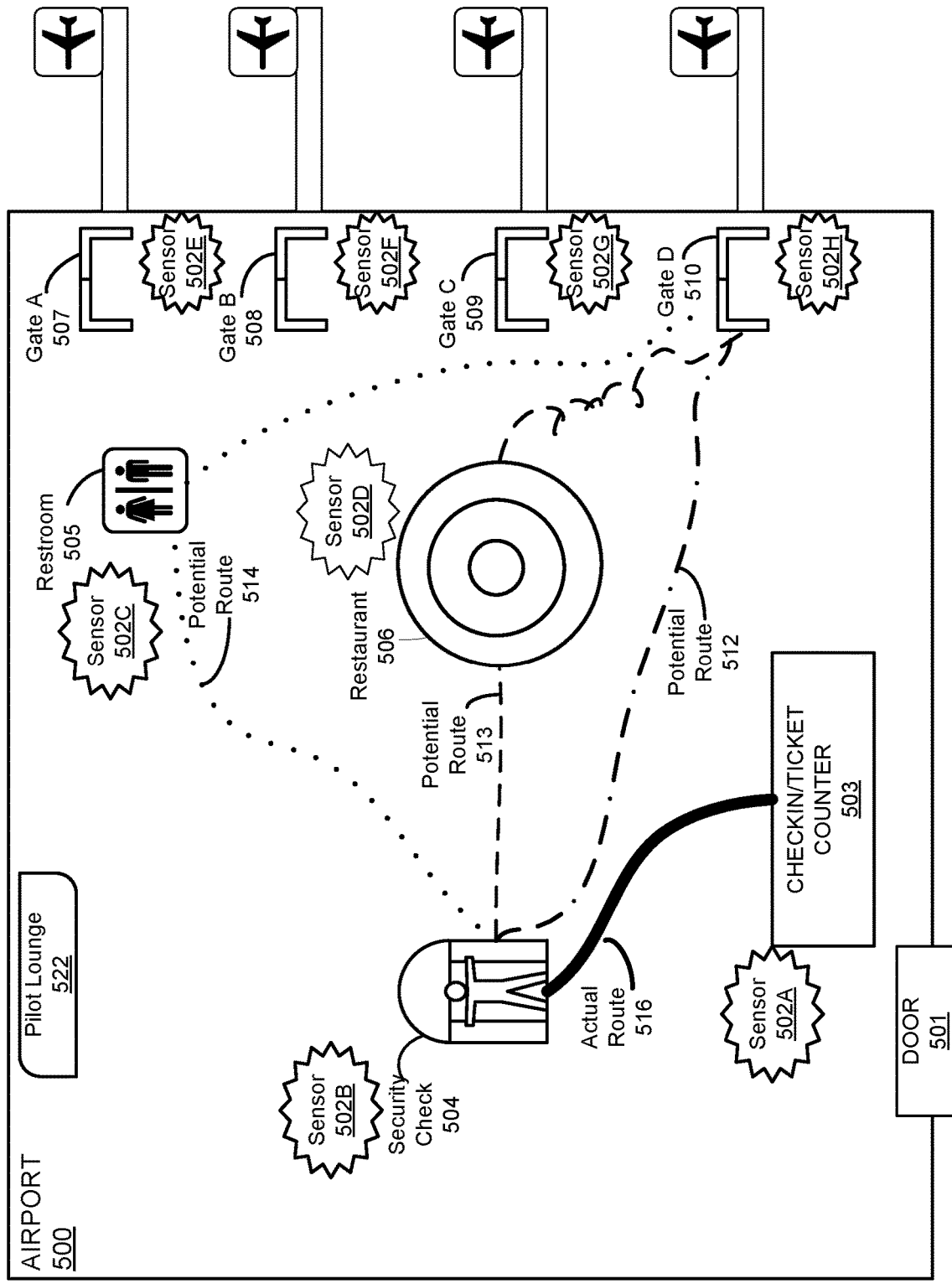

Turning to FIG. 5B, Rick may traverse from check-in/ticket counter 503 to security check 504 (e.g., along actual route 516). Sensor 502B may identify Rick at a second location (e.g., at security check 504) at a second point in time (e.g., at 6:00 a.m.). Actual route 516 (e.g., the solid line) may indicate a path taken by Rick between check-in/ticket counter 503 and security check 504. Actual route 516 may, when compared to potential route 511, indicate that Rick is not a security risk since actual route 516 aligns with potential route 511.

Once Rick reaches security check 504, Rick may enter the main open areas of airport 500 and may be presented with a variety of different paths that he may choose to follow. However, for most persons trying to make their flights, only a few paths are typically followed. The level of security threat ascribed to different persons may be based on their propensity to follow these typical paths. To illustrate how following different paths may be used to ascribe different levels of security risks, now consider two different scenarios illustrated in FIGS. 5C, 5D, and 5E, respectively, where Rick follows a typical path, an atypical path, and a minor deviation of a typical path.

Figure 5C:
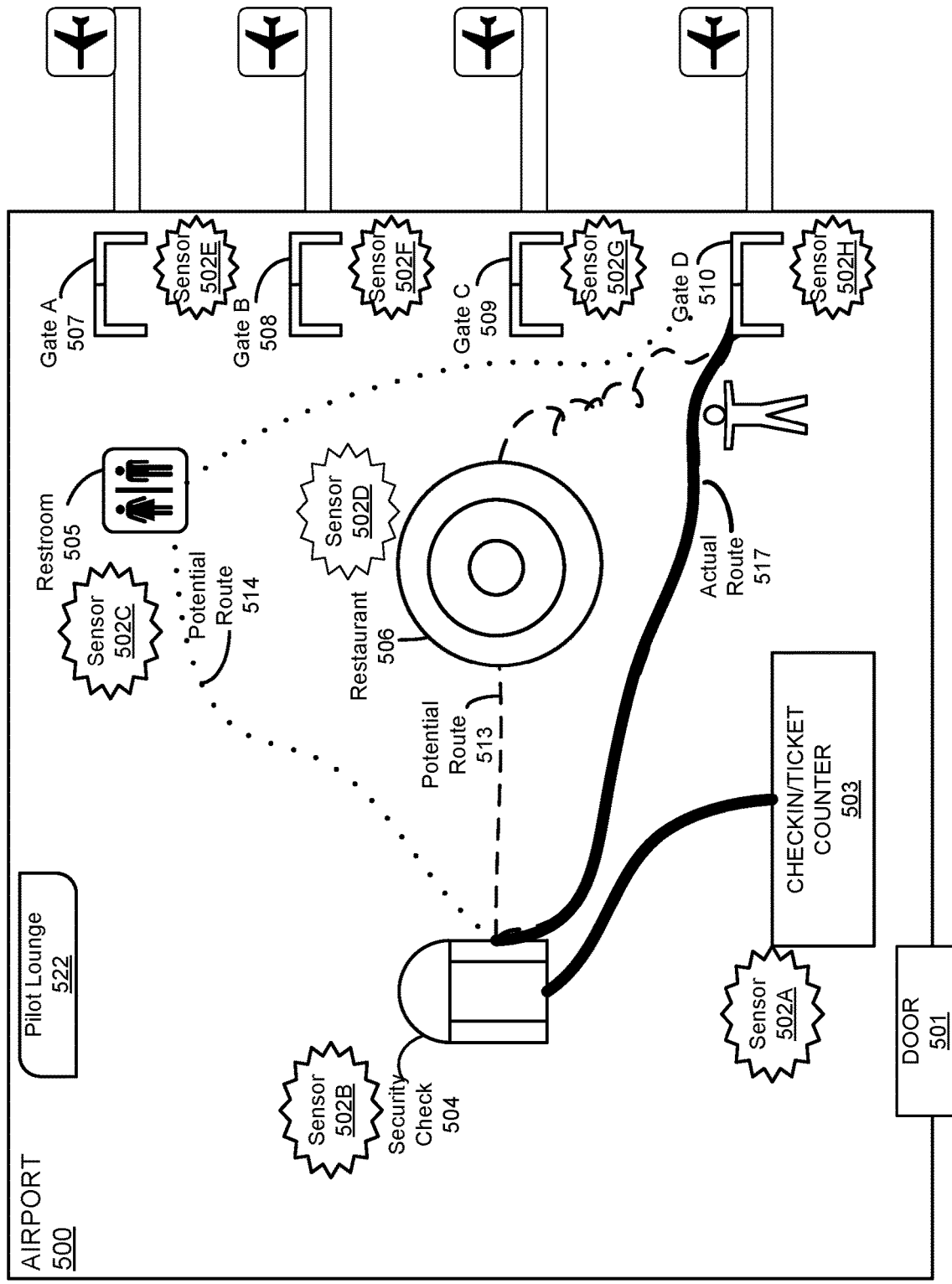

Turning to FIG. 5C, now consider a first example scenario in which Rick may feel anxious about missing his flight and therefore he may decide to walk directly to the gate after passing through the security check point. Rick may traverse from security check 504 to Gate D 510 (e.g., actual route 517). Sensor 502H may identify Rick at a third location (e.g., Gate D 510) at a third point in time (e.g., at 6:30 a.m.). Actual route 517 may indicate that Rick is not a security risk since actual route 517 aligns with potential route 512.

Thus, as illustrated in FIG. 5C, when Rick follows a typical path a resource prioritization for monitoring Rick may be reduced based on an inferred reduced level of security risk presented by Rick (i.e., that Rick presents little to no security risk based on his path selection).

Figure 5D:
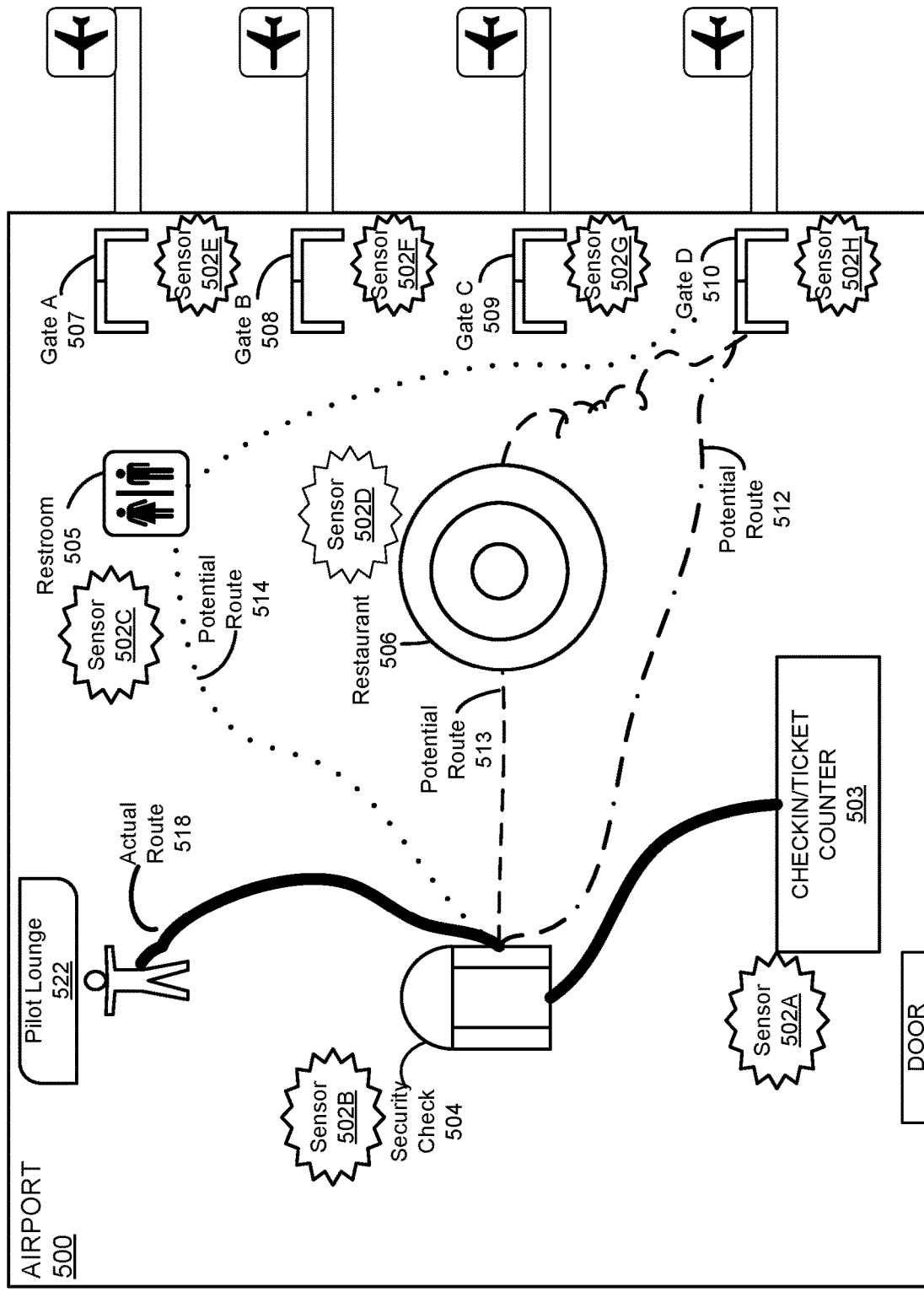

Turning to FIG. 5D, now consider a second example scenario in which Rick may be sleeping when he enters the main area of Airport 500. Seeing pilot lounge 522 after passing through security check 504, Rick may decide that he wants to see if there are any beds to nap on in the pilot lounge prior to his flight. In this example, only pilots may have authorization to enter pilot lounge 522 (e.g., Rick does not have authorization to enter pilot lounge 522) and there may be no other reason for passengers to typically approach pilot lounge 522 on their way to their gates.

To attempt to nap, Rick may traverse from security check 504 to pilot lounge 522 (e.g., actual route 518). Actual route 518 may indicate that Rick is a security risk since actual route 518 does not align with any of the potential routes (e.g., potential routes 512, 513, 514) after passing through security check 504. However, in addition to being identified as a security risk due to not following a potential route, after a certain amount of time passes Rick is identified as being an elevated security risk because, as seen in FIG. 5D, he does not pass by any other sensors thus confirming that not only did Rick diverge from the potential paths but Rick also has not elected to proceed toward his gate (i.e., stop position) at all. Thus, Rick may be treated as presenting an increased security risk.

Thus, as illustrated in FIG. 5D, when Rick follows an atypical path, resource prioritization for monitoring Rick may be increased (e.g., significantly) based on an inferred increased level of security risk presented by Rick.

Figure 5E:
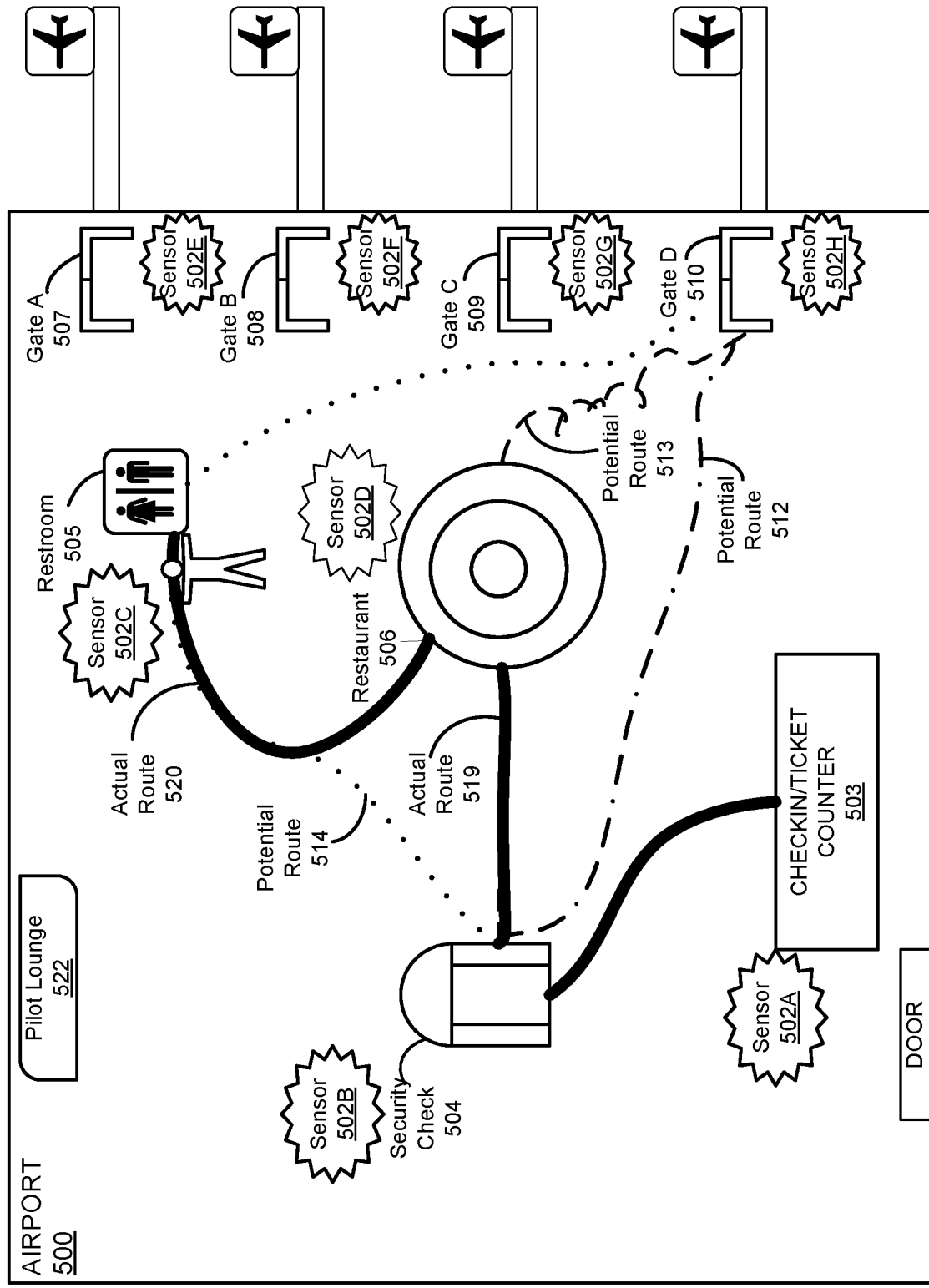

Turning to FIG. 5E, now consider a third example scenario in which Rick may be hungry after passing through security check 504. Once past security check 504, Rick may decide that he wants to eat at restaurant 506 (e.g., Chipotle). Rick may traverse from security check 504 to restaurant 506 (e.g., actual route 519). When doing so, sensor 502D identify Rick at a third location (e.g., restaurant 506) at a third point in time (e.g., at 6:30 a.m.) thereby allowing for actual route 519 to be identified. Actual route 519 may indicate that Rick is not a security risk since actual route 519 aligns with potential route 513.

After eating at restaurant 506, Rick may proceed to restroom 505 (e.g., actual route 520) to prepare himself for his flight. On the way to restroom 505, sensor 502C may identify Rick at a fourth location (e.g., restroom 505) at a fourth point in time (e.g., at 6:45 a.m.). Because Rick has diverted from actual route 519 (which follows potential route 513) and started following potential route 514 (e.g., actual route 520), Rick may only not follow any of the potential routes for a short duration of time and for a short distance. Such deviations may be relatively common. Consequently, if such deviations are treated as an indicator of elevated security risk, the limited resources available for monitoring security threats may be diluted to greatly to provide effective security threat monitoring.

To more efficiently allocation limited computing resources, the level of deviation from the potential routes by Rick may be compared to thresholds, or otherwise analyzed, to ascertain whether Rick's deviation should be treated as being one that warrants treating Rick as presenting an increased security threat level. For example, Rick's deviation (e.g., spatial and/or time) from the potential routes may be compared to a threshold that, if exceeded, indicates that Rick is presenting an elevated security risk. However, in this example scenario, because Rick only deviates from one of the potential routes (e.g., potential route 514) for a brief amount of time and within a location range (e.g., a distance threshold) associated with two potential routes (e.g., 513 and 514), Rick's path may indicate that Rick presents little (and/or no) elevated security risk.

Thus, as illustrated in FIG. 5E, when Rick follows an actual path that only represents a minor deviation from typical paths in an environment, resource prioritization for monitoring Rick may be maintained (and/or reduced) based on an inferred stable level of security risk presented by Rick.

Figure 6:
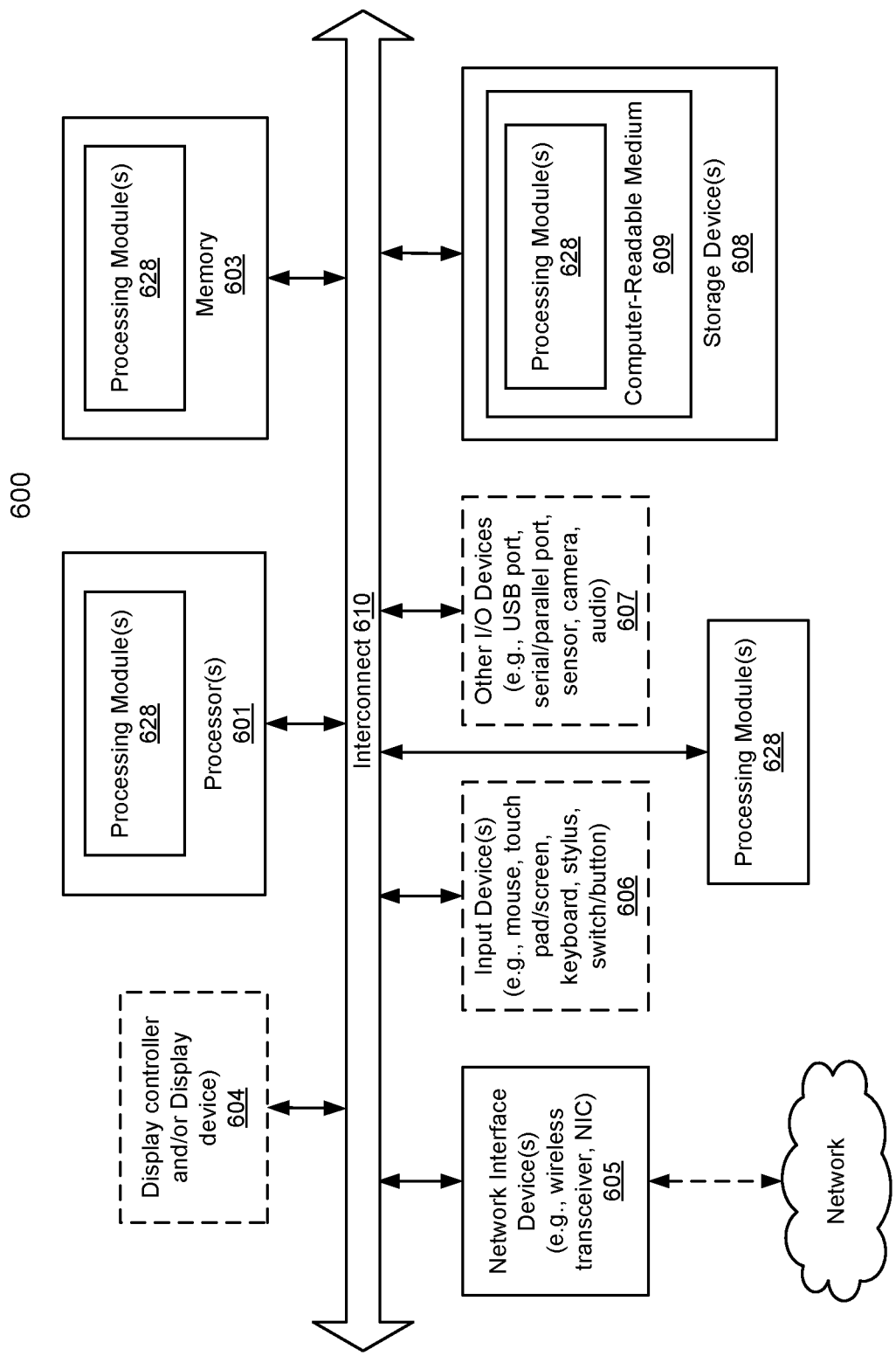
FIG. 6 shows a block diagram illustrating a data processing system in accordance with an embodiment.

Any of the components illustrated in FIGS. 1-5E may be implemented with one or more computing devices. Turning to FIG. 6, a block diagram illustrating an example of a data processing system (e.g., a computing device) in accordance with an embodiment is shown. For example, system 600 may represent any of data processing systems described above performing any of the processes or methods described above. System 600 can include many different components. These components can be implemented as integrated circuits (ICs), portions thereof, discrete electronic devices, or other modules adapted to a circuit board such as a motherboard or add-in card of the computer system. Note also that system 600 is intended to show a high-level view of many components of the computer system. However, it is to be understood that additional components may be present in certain implementations and furthermore, different arrangement of the components shown may occur in other implementations. System 600 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 600 includes processor 601, memory 603, and devices 605-607 via a bus or an interconnect 610. Processor 601 may represent a single processor or multiple processors with a single processor core or multiple processor cores included therein. Processor 601 may represent one or more general-purpose processors such as a microprocessor, a central processing unit (CPU), or the like. More particularly, processor 601 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 601 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 601 may communicate with memory 603, which in one embodiment can be implemented via multiple memory devices to provide for a given amount of system memory. Memory 603 may include one or more volatile storage (or memory) devices such as random access memory (RAM), dynamic RAM (DRAM), synchronous DRAM (SDRAM), static RAM (SRAM), or other types of storage devices. Memory 603 may store information including sequences of instructions that are executed by processor 601, or any other device. For example, executable code and/or data of a variety of operating systems, device drivers, firmware (e.g., input output basic system or BIOS), and/or applications can be loaded in memory 603 and executed by processor 601. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 600 may further include IO devices such as devices (e.g., 605, 606, 607, 608) including network interface device(s) 605, optional input device(s) 606, and other optional IO device(s) 607. Network interface device(s) 605 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 606 may include a mouse, a touch pad, a touch sensitive screen (which may be integrated with a display device of optional graphics subsystem 604), a pointer device such as a stylus, and/or a keyboard (e.g., physical keyboard or a virtual keyboard displayed as part of a touch sensitive screen). For example, input device(s) 606 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 607 may include an audio device. An audio device may include a speaker and/or a microphone to facilitate voice-enabled functions, such as voice recognition, voice replication, digital recording, and/or telephony functions. Other IO devices 607 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 607 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 610 via a sensor hub (not shown), while other devices such as a keyboard or thermal sensor may be controlled by an embedded controller (not shown), dependent upon the specific configuration or design of system 600.

To provide for persistent storage of information such as data, applications, one or more operating systems and so forth, a mass storage (not shown) may also couple to processor 601. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 601, e.g., via a serial peripheral interface (SPI). This flash device may provide for non-volatile storage of system software, including a basic input/output software (BIOS) as well as other firmware of the system.

Storage device 608 may include computer-readable storage medium 609 (also known as a machine-readable storage medium or a computer-readable medium) on which is stored one or more sets of instructions or software (e.g., processing module, unit, and/or processing module/unit/logic 628) embodying any one or more of the methodologies or functions described herein. Processing module/unit/logic 628 may represent any of the components described above. Processing module/unit/logic 628 may also reside, completely or at least partially, within memory 603 and/or within processor 601 during execution thereof by system 600, memory 603 and processor 601 also constituting machine-accessible storage media. Processing module/unit/logic 628 may further be transmitted or received over a network via network interface device(s) 605.

Computer-readable storage medium 609 may also be used to store some software functionalities described above persistently. While computer-readable storage medium 609 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 628, components and other features described herein can be implemented as discrete hardware components or integrated in the functionality of hardware components such as ASICS, FPGAs, DSPs or similar devices. In addition, processing module/unit/logic 628 can be implemented as firmware or functional circuitry within hardware devices. Further, processing module/unit/logic 628 can be implemented in any combination hardware devices and software components.

Note that while system 600 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for prioritizing allocation of limited computing resources of a data processing system, the method comprising:
    obtaining an identifier;
    obtaining schedule data using the identifier, the schedule data specifying a start position and a presumed stop position for a person, the person being presumed to traverse to the presumed stop position from the start position;
    performing a forensic search of sensor data for instances of appearances of the person identified by the identifier to obtain position data for the person;
    generating a path based on the position data, the path being followed by the person after the person leaves the start position specified by the schedule data;
    obtaining training data based on the path and the schedule data; and
    allocating the limited computing resources of the data processing system based on the training data to modify a level of surveillance of the person.

2. The method of claim 1, wherein obtaining the identifier comprises:
    during a check in process, reading the identifier from an article controlled by the person.

3. The method of claim 2, wherein obtaining the schedule data comprises:
    performing a lookup based on the identifier, the lookup returning a gate out of which the person is expected to depart in the future, and the stop position is a location of the gate.

4. The method of claim 3, wherein performing the forensic search comprises:
    obtaining images of scenes in which the person may be present as the person moves toward the gate;
    filtering the images for instances of appearances of the person to identify a portion of the images in which the person appears; and
    for each image of the portion of the images, marking:
        the person as being at a location, among locations shown in the images of the scenes, corresponding to a sensor of sensors through which the image was obtained, and
        the person as being present at the location when the image was obtained.

5. The method of claim 4, wherein generating the path comprises:
    temporally ordering the locations based on when the person was marked as being present at the locations.

6. The method of claim 5, wherein obtaining the training data based on the path and the schedule data comprises:
    establishing a relationship between:
        a pair of the start position and the stop position, and
        the path.

7. The method of claim 6, wherein allocating the limited computing resources of the data processing system based on the training data to modify a level of surveillance of the person comprises:
    obtaining a trained inference model using the relationship;
    obtaining an inference using the trained inference model, the inference indicating a path that a second person must follow to be considered low risk;
    monitoring an actual path of the second person using the sensors;
    making a comparison between the path that the second person must follow to be considered low risk and the actual path; and
    in an instance of the comparison where the actual path diverges from the path that the second person must follow to be considered low risk:
        increasing a level of expenditure of the limited computing resources to monitor the second person.

8. A non-transitory machine-readable medium having instructions stored therein, which when executed by a processor, cause the processor to perform operations for prioritizing allocation of limited computing resources of a data processing system, the operations comprising:
    obtaining an identifier;
    obtaining schedule data using the identifier, the schedule data specifying a start position and a presumed stop position for a person, the person being presumed to traverse to the presumed stop position from the start position;
    performing a forensic search of sensor data for instances of appearances of the person identified by the identifier to obtain position data for the person;
    generating a path based on the position data, the path being followed by the person after the person leaves the start position specified by the schedule data;
    obtaining training data based on the path and the schedule data; and
    allocating the limited computing resources of the data processing system based on the training data to modify a level of surveillance of the person.

9. The non-transitory machine-readable medium of claim 8, wherein obtaining the identifier comprises:
    during a check in process, reading the identifier from an article controlled by the person.

10. The non-transitory machine-readable medium of claim 9, wherein obtaining the schedule data comprises:
    performing a lookup based on the identifier, the lookup returning a gate out of which the person is expected to depart in the future, and the stop position is a location of the gate.

11. The non-transitory machine-readable medium of claim 10, wherein performing the forensic search comprises:
    obtaining images of scenes in which the person may be present as the person moves toward the gate;

filtering the images for instances of appearances of the person to identify a portion of the images in which the person appears; and for each image of the portion of the images, marking:

the person as being at a location, among locations shown in the images of the scenes, corresponding to a sensor of sensors through which the image was obtained, and the person as being present at the location when the image was obtained.

12. The non-transitory machine-readable medium of claim 11, wherein generating the path comprises:

temporally ordering the locations based on when the person was marked as being present at the locations.

13. The non-transitory machine-readable medium of claim 12, wherein obtaining the training data based on the path and the schedule data comprises:

establishing a relationship between:

a pair of the start position and the stop position, and the path.

14. The non-transitory machine-readable medium of claim 13, wherein allocating the limited computing resources of the data processing system based on the training data to modify a level of surveillance of the person comprises:

obtaining a trained inference model using the relationship;

obtaining an inference using the trained inference model, the inference indicating a path that a second person must follow to be considered low risk;

monitoring an actual path of the second person using the sensors;

making a comparison between the path that the second person must follow to be considered low risk and the actual path; and in an instance of the comparison where the actual path diverges from the path that the second person must follow to be considered low risk:

increasing a level of expenditure of the limited computing resources to monitor the second person.

15. A data processing system, comprising:

a processor; and a memory coupled to the processor to store instructions, which when executed by the processor, cause the processor to perform operations for prioritizing allocation of limited computing resources of the data processing system, the operations comprising:

obtaining an identifier;

obtaining schedule data using the identifier, the schedule data specifying a start position and a presumed stop position for a person, the person being presumed to traverse to the presumed stop position from the start position;

performing a forensic search of sensor data for instances of appearances of the person identified by the identifier to obtain position data for the person;

generating a path based on the position data, the path being followed by the person after the person leaves the start position specified by the schedule data;

obtaining training data based on the path and the schedule data; and allocating the limited computing resources of the data processing system based on the training data to modify a level of surveillance of the person.

16. The data processing system of claim 15, wherein obtaining the identifier comprises:

during a check in process, reading the identifier from an article controlled by the person.

17. The data processing system of claim 16, wherein obtaining the schedule data comprises:

performing a lookup based on the identifier, the lookup returning a gate out of which the person is expected to depart in the future, and the stop position is a location of the gate.

18. The data processing system of claim 17, wherein performing the forensic search comprises:

obtaining images of scenes in which the person may be present as the person moves toward the gate;

filtering the images for instances of appearances of the person to identify a portion of the images in which the person appears; and for each image of the portion of the images, marking:

the person as being at a location, among locations shown in the images of the scenes, corresponding to a sensor of sensors through which the image was obtained, and the person as being present at the location when the image was obtained.

19. The data processing system of claim 18, wherein generating the path comprises:

temporally ordering the locations based on when the person was marked as being present at the locations.

20. The data processing system of claim 19, wherein obtaining the training data based on the path and the schedule data comprises:

establishing a relationship between:

a pair of the start position and the stop position, and the path.

* * * * *